(12) United States Patent
Kinoshita et al.

(10) Patent No.: US 7,075,712 B2
(45) Date of Patent: Jul. 11, 2006

(54) COMBINING AND DISTRIBUTING AMPLIFIERS FOR OPTICAL NETWORK AND METHOD

(75) Inventors: Susumu Kinoshita, Plano, TX (US); Remi Pecqueur, Garland, TX (US); Cechan Tian, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 220 days.

(21) Appl. No.: 10/159,499

(22) Filed: May 30, 2002

(65) Prior Publication Data

US 2003/0223104 A1 Dec. 4, 2003

(51) Int. Cl.
*H01S 3/00* (2006.01)
*H04J 14/00* (2006.01)

(52) U.S. Cl. ........................ 359/349; 398/66
(58) Field of Classification Search ................ 359/349; 398/66
See application file for complete search history.

(56) References Cited

U.S. PATENT DOCUMENTS

| | | | | |
|---|---|---|---|---|
| 5,128,789 A * | 7/1992 | Abramovitz | .................. | 398/51 |
| 5,299,048 A | 3/1994 | Suyama | ........................ | 359/179 |
| 5,331,449 A * | 7/1994 | Huber et al. | .................. | 398/76 |
| 5,337,175 A | 8/1994 | Ohnsorge et al. | ............ | 359/125 |
| 5,343,320 A | 8/1994 | Anderson | .................... | 359/160 |
| 5,392,154 A * | 2/1995 | Chang et al. | ............. | 359/341.3 |
| 5,422,968 A * | 6/1995 | Hanatani et al. | ............... | 385/24 |
| 5,452,116 A * | 9/1995 | Kirkby et al. | ................. | 398/79 |
| 5,457,562 A * | 10/1995 | Tremblay | ..................... | 398/70 |
| 5,550,818 A * | 8/1996 | Brackett et al. | ........ | 370/395.51 |
| 5,570,218 A * | 10/1996 | Sotom | .......................... | 398/55 |
| 5,675,432 A | 10/1997 | Kosaka | ........................ | 359/341 |
| 5,757,529 A * | 5/1998 | Desurvire et al. | ........... | 398/178 |
| 5,771,112 A | 6/1998 | Hamel et al. | ................ | 359/128 |
| 5,774,606 A | 6/1998 | de Barros et al. | ............ | 385/24 |
| 5,778,118 A | 7/1998 | Sridhar | ......................... | 385/24 |
| 5,815,613 A * | 9/1998 | Fatehi et al. | ................... | 385/22 |
| 5,864,414 A * | 1/1999 | Barnsley et al. | .............. | 398/71 |
| 5,903,371 A | 5/1999 | Arecco et al. | .............. | 359/119 |
| 5,914,799 A * | 6/1999 | Tan | .............................. | 398/92 |
| 5,959,750 A * | 9/1999 | Eskildsen et al. | ............. | 398/92 |
| 6,049,417 A * | 4/2000 | Srivastava et al. | ........ | 359/337.4 |
| 6,061,170 A * | 5/2000 | Rice et al. | ................... | 359/345 |
| 6,122,095 A | 9/2000 | Fatehi | ......................... | 359/337 |
| 6,122,096 A | 9/2000 | Fatehi | ......................... | 359/341 |
| 6,160,648 A | 12/2000 | Öberg et al. | ................. | 359/110 |
| 6,185,024 B1 * | 2/2001 | Johnson et al. | ................. | 398/9 |

(Continued)

FOREIGN PATENT DOCUMENTS

EP 0 474 426 A2 3/1992

(Continued)

OTHER PUBLICATIONS

Bacque, B. et al., "R-OADM Architecture—Now you can Control the Light," Tropic Networks, pp. 1-11, 2003.

(Continued)

*Primary Examiner*—Deandra M. Hughes
(74) *Attorney, Agent, or Firm*—Baker Botts L.L.P.

(57) ABSTRACT

A system for distributing optical signals comprises a plurality of optical splitter stages. The optical splitter stages are each operable to passively split each of one or more optical signals provided to the stage into a plurality of optical signals. At least one of the optional splitter stages comprises an amplification stage, with the amplification stage including a plurality of gain media. The gain media are each operable to amplify an optical signal with pump power.

37 Claims, 16 Drawing Sheets

U.S. PATENT DOCUMENTS

| | | | |
|---|---|---|---|
| 6,204,960 B1 | 3/2001 | Desurvire | 359/341 |
| 6,236,498 B1 | 5/2001 | Freeman et al. | 359/341 |
| 6,236,500 B1* | 5/2001 | Suzuki et al. | 359/337.5 |
| 6,266,168 B1* | 7/2001 | Denkin et al. | 398/5 |
| 6,271,950 B1 | 8/2001 | Hansen et al. | 359/135 |
| 6,282,334 B1 | 8/2001 | Hodgson et al. | 385/12 |
| 6,307,668 B1* | 10/2001 | Bastien et al. | 359/337.1 |
| 6,310,716 B1 | 10/2001 | Evans et al. | 359/334 |
| 6,335,823 B1 | 1/2002 | Ohshima et al. | 359/341.32 |
| 6,339,495 B1 | 1/2002 | Cowle et al. | 359/341.4 |
| 6,400,498 B1* | 6/2002 | Shimomura et al. | 359/341.1 |
| 6,411,418 B1* | 6/2002 | Deri et al. | 398/182 |
| 6,426,832 B1* | 7/2002 | Kinoshita | 359/337 |
| 6,445,850 B1 | 9/2002 | Zhou et al. | 385/24 |
| 6,452,718 B1* | 9/2002 | Augustsson | 359/337.1 |
| 6,456,406 B1 | 9/2002 | Arecco et al. | 359/119 |
| 6,456,407 B1 | 9/2002 | Tammela et al. | 359/119 |
| 6,483,636 B1* | 11/2002 | Sugaya et al. | 359/349 |
| 6,493,119 B1* | 12/2002 | Kuo et al. | 398/49 |
| 6,501,597 B1* | 12/2002 | Pitt et al. | 359/349 |
| 6,529,303 B1 | 3/2003 | Rowan et al. | 359/128 |
| 6,580,550 B1* | 6/2003 | Kosaka et al. | 359/337.1 |
| 6,580,552 B1* | 6/2003 | Welch | 359/341.32 |
| 6,590,681 B1 | 7/2003 | Egnell et al. | 359/127 |
| 6,631,018 B1 | 10/2003 | Milton et al. | 359/119 |
| 6,650,468 B1* | 11/2003 | Bryant et al. | 359/349 |
| 6,697,193 B1* | 2/2004 | Meli et al. | 359/349 |
| 6,771,905 B1* | 8/2004 | Bortz | 398/45 |
| 2002/0008901 A1 | 1/2002 | Kinoshita | 359/341.1 |
| 2002/0018263 A1* | 2/2002 | Ge et al. | 359/128 |
| 2002/0048066 A1* | 4/2002 | Antoniades et al. | 359/128 |
| 2002/0067523 A1 | 6/2002 | Way | 359/119 |
| 2002/0145779 A1 | 10/2002 | Strasser et al. | 359/124 |
| 2002/0149817 A1 | 10/2002 | Kiliccote et al. | 359/119 |
| 2003/0030895 A1* | 2/2003 | So et al. | 359/349 |
| 2004/0208576 A1* | 10/2004 | Kinoshita et al. | 398/83 |

FOREIGN PATENT DOCUMENTS

| | | |
|---|---|---|
| EP | 0 721 261 A1 | 7/1996 |
| EP | 1 033 835 A2 | 9/2000 |
| WO | WO 99/65164 | 12/1999 |
| WO | WO 02/11340 A1 | 2/2002 |

OTHER PUBLICATIONS

U.S. Appl. No. 10/108,734, entitled "Method and System for Control Signaling in an Open Ring Optical Network," filed Mar. 27, 2002.

U.S. Appl. No. 10/108,741, entitled "Method and System for Testing During Operation of an Open Ring Optical Network," filed Mar. 27, 2002.

U.S. Appl. No. 10/112,022, entitled "Flexible Open Ring Optical Network and Method," filed Mar. 28, 2002.

U.S. Appl. No. 10/158,523, entitled "Optical Ring Network with Optical Subnets and Method," filed May 29, 2002.

U.S. Appl. No. 10/158,348, entitled "Multiple Subnets in an Optical Ring Network and Method," filed May 29, 2002.

U.S. Appl. No. 10/159,307, entitled "Optical Add/Drop Node and Method," filed May 30, 2002.

U.S. Appl. No. 10/159,464, entitled "Passive Add/Drop Amplifier for Optical Network and Method," filed May 30, 2002.

Kinoshita et al., "Flexible Twin Open Ring Metro WDM Network," OECC, pp. 713-714, Oct. 2003.

Tian et al., "OUPSR Protected Flexible Metro WDM Network," ECOC, pp. 826-827, 2003.

Boskovic et al., "Broadcast and Select OADM Nodes Application and Performance Trade-offs," OFC, pp. 158-159, 2002.

Kinoshita et al. "Flexible Metro WDM Network with Photonic Domains", Fujitsu Laboratories of America, Inc., 3 pages, Feb. 24-26, 2004.

Suzuki et al., "Prototype of 12.5 GHz-Spaced Tapped-Type OADM for DWDM Metro Ring Networks," ECOC-IOOC Proceedings—vol. 4, pp. 902-903, Sep. 21-23, 2003.

Wolde, J., et al., "Optical Ethernet Metro Access Network Protype: Implementation and Results," ECOC-IOOC 2003, 3 pages, Sep. 21-25, 2003.

Grenfeldt, "ERION-Ericsson optical networking using WDM technology," Ericsson Review No. 3, pp. 132-137, 1998.

Ashmead, "ROADMap for the Metro Market," Fiberoptic Product News, 3 pages (36, 38, and 40), Oct. 2001.

Batchellor, "Optical Networking the Ericsson Way," Ericsson Limited, Business Unit Transport and Cable Networks, pp. 1-4, Feb. 22, 2002.

Mookherjea, "Remotely Pumped Optical Distribution Networks: A Distributed Amplifier Model", Journal of Lightwave Technology, vol. 19, No. 7, pp. 926-932, Jul. 2001.

PCT International Search Report for PCT US03/16194, 7 pages, Oct. 28, 2003.

* cited by examiner

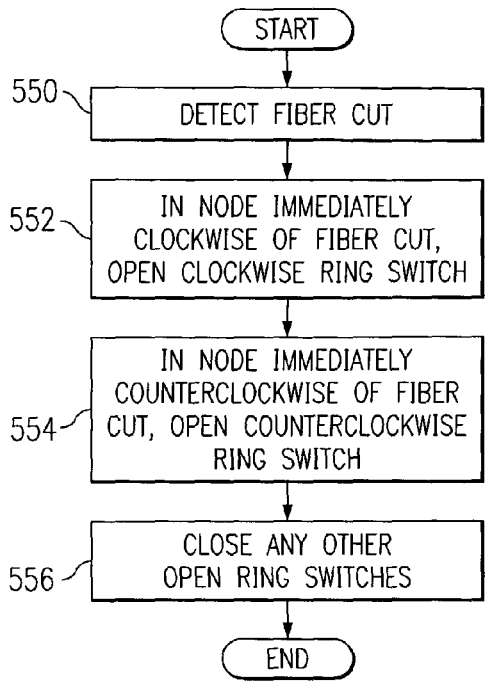
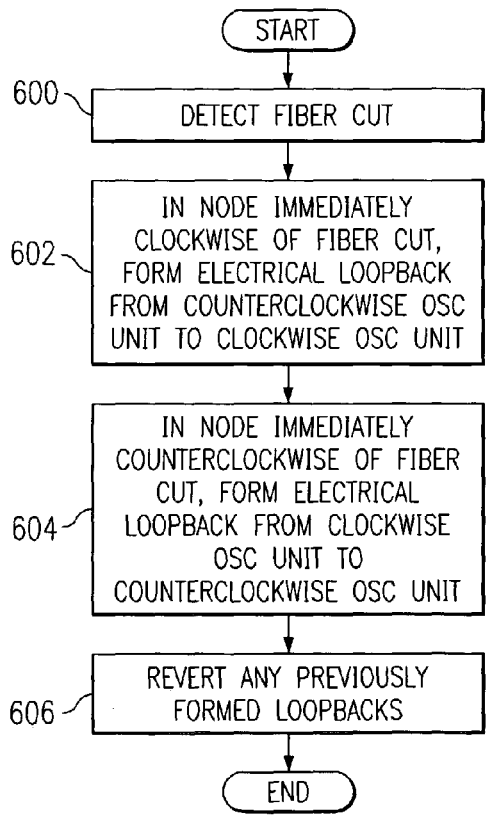
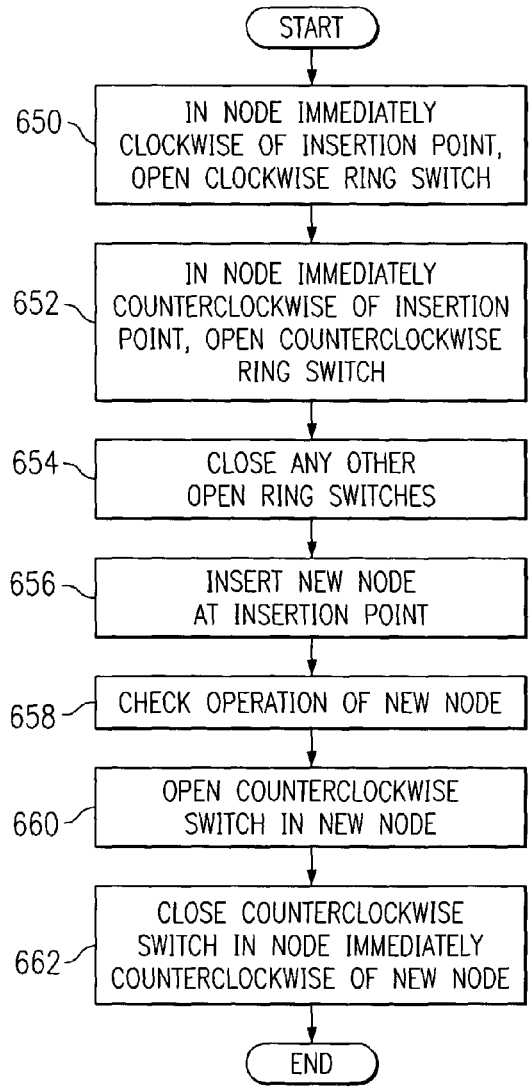

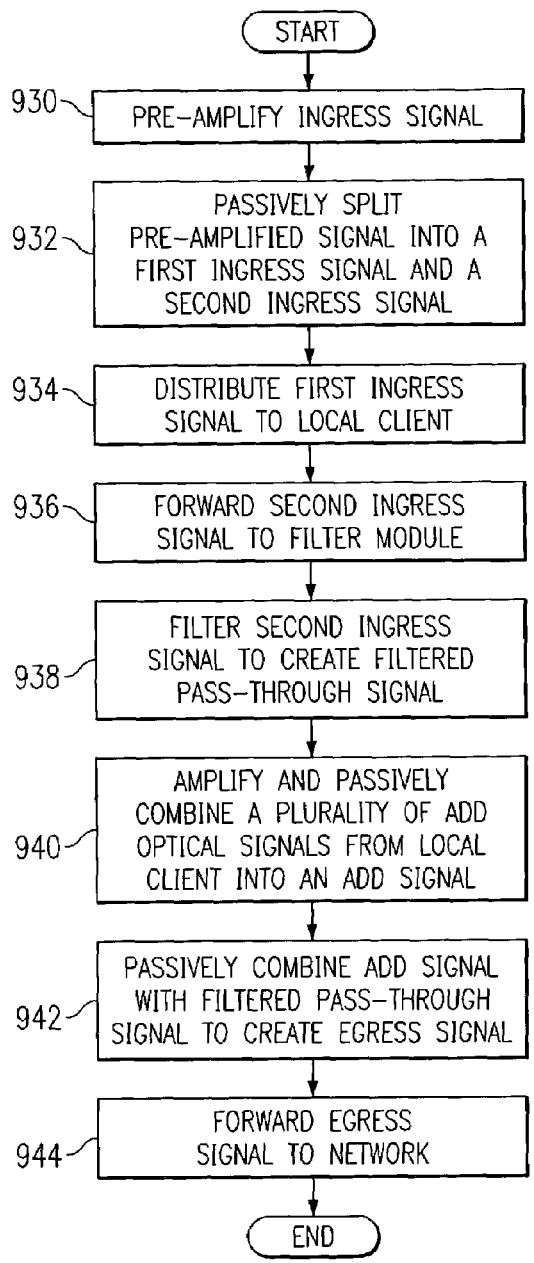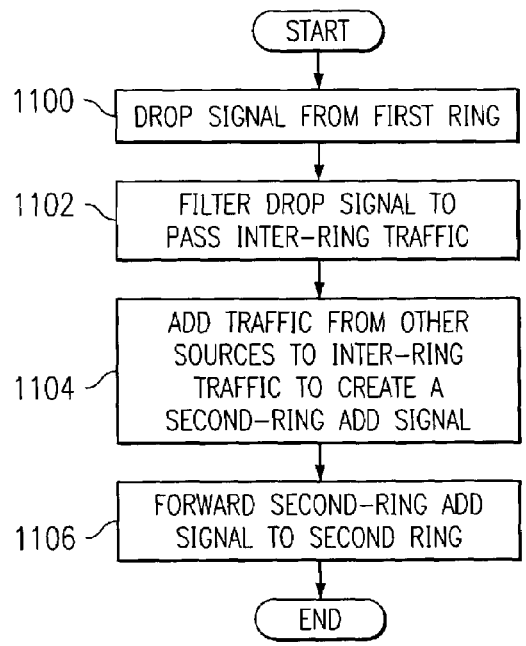

COMBINING AND DISTRIBUTING AMPLIFIERS FOR OPTICAL NETWORK AND METHOD

TECHNICAL FIELD OF THE INVENTION

The present invention relates generally to optical transport systems, and more particularly to a combining and distributing amplifier for an optical network.

BACKGROUND OF THE INVENTION

Telecommunications systems, cable television systems and data communication networks use optical networks to rapidly convey large amounts of information between remote points. In an optical network, information is conveyed in the form of optical signals through optical fibers. Optical fibers are thin strands of glass capable of transmitting the signals over long distances with very low loss.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels. In WDM, DWDM and other optical networks, microelectromechanical switches (MEMS), arrayed waveguide gratings (AWGs), interleavers, and/or fiber gratings (FGs) are typically used to add and drop traffic at network nodes and to multiplex and demultiplex traffic at network nodes.

SUMMARY OF THE INVENTION

The present invention provides a combining and distributing amplifier for an optical network and a corresponding method that eliminate or reduce problems and disadvantages associated with previous systems and methods. In a particular embodiment, one or more traffic channels are amplified in line while being combined and/or distributed.

In accordance with one embodiment of the present invention, a system for distributing optical signals includes a plurality of optical splitter stages. The optical splitter stages are each operable to passively split each of one or more optical signals provided to the stage into a plurality of optical signals. At least one of the optional splitter stages comprises an amplification stage, with the amplification stage including a plurality of gain media. The gain media are each operable to amplify an optical signal with pump power.

Technical advantages of the present invention include providing a combining and/or distributing amplifier and method. In one embodiment, optical signals are distributed or combined using optical couplers in stages and the coupler loss reduced and/or cancelled out with erbium doped fiber (EDF), erbium doped waveguide (EDW), or other suitable in-line amplifiers.

Another technical advantage of the present invention includes providing combining and/or distributing amplifiers with flexible channel spacing. In one embodiment, distributors/combiners include couplers, doped in-line amplifiers, tunable filters, wide-band receivers, and tunable transponders. The tunable transponders can transmit any wavelength in a pre-determined determined signal band. The wide-band receivers can receive any wavelength signal in the signal band. The tunable filter in front of the receiver can select any wavelength in the signal band. Therefore, any signal signed on a certain wavelength may be transmitted to any receiver. This configuration, supports various data-rate services, such as for example, 150 megabits per second (Mb/s) 600 Mb/s, 2.4 gigabits per second (Gb/s), 10 Gb/s and 40 Gb/s, and various modulations schemes, such as for example, direct modulation and external modulation.

Still another technical advantage of the present system includes providing a modular combiner/distributor architecture. In one embodiment, a primary combiner/distributor board may provide ingress signals to a plurality of extension ports each configured to receive an upgrade board with further combiner/distributor stages and functionality. In addition, a modular pump array board may be provide to feed pump energy to the in-line amplifiers in the primary and upgrade combiner/distributor boards. As a result, users may "pay as they grow" and only pay for the number of components needed at a particular time.

Still another technical advantage of the present invention includes providing an automatic gain control (AGC) or other suitable controller for in-line amplifiers of a combiner/distributor unit. In one embodiment, the controller measures energy of ingress and egress signals and adjusts pump power provided to in-line amplifiers based on the measured energy of the signals and gain determined based on the measured energy. Signal power at the expansion ports may be limited to an eye-safe or other suitable level to, among other things, prevent injuries to operators servicing the boards in hazardous conditions.

Still another technical advantage of the present invention includes providing a low cost unit wherein multiplexers and demultiplexers may be omitted in a node. This allows for less-expensive and more reliable photonic nodes and networks. Whereas traditional optic networks have fixed channel spacing, large losses in the optical nodes, and high cost due to complicated configurations, the present invention provides low cost, simple network nodes with no channel-spacing restrictions, no band-pass narrowing, and low loss. These features are well suited to future metro networks, access networks, and other networks wherein the cost must be low with a high implementation and network flexibility, and high compatibility between different vendors and new technologies.

Still another technical advantage of the present invention includes providing a passive, low cost, multicast function for optical signals. In one embodiment, optical signals may be naturally multicast by splitting the optical signal into multiple signals via multioptical coupler stages. The split signals may be amplified in-line during the splitting process to cancel or minimize the splitting loss effect and/or enhance signal strength in the resulting signals multicast to a plurality of users. In this way, cable TV and other similar services may be efficiently supported by an optical network in a cost-effective manner.

Still another technical advantage of the present invention is an increase in pump efficiency through the use of pump couplers connecting the branches of the distributor and/or combiners. In addition, the couplers may reduce signal power imbalance of the split signals. In a particular embodiment, pump efficiency may be increased by 30% or more and outputs equalized to within 1 dB.

It will be understood that the various embodiments of the present invention may include some, all, or none of the enumerated technical advantages. In addition, other technical advantages of the present invention may be readily apparent to one skilled in the art from the following figures, description and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which:

FIG. 7 is a flow diagram illustrating a method for protection switching for the optical network of FIG. 1 in accordance with one embodiment of the present invention;

FIG. 9 is a flow diagram illustrating a method for OSC protection switching in the optical network of FIG. 1 in accordance with one embodiment of the present invention;

FIG. 11 is a flow diagram illustrating a method for inserting a node into the optical network of FIG. 1 in accordance with one embodiment of the present invention;

FIG. 21 is a flow diagram illustrating a method of adding and dropping signals to and from the node of FIG. 20 in accordance with one embodiment of the present invention;

FIG. 25 is a flow diagram illustrating a method of communicating a signal between ring networks in accordance with one embodiment of the present invention.

DETAILED DESCRIPTION OF THE INVENTION

Figure 1:
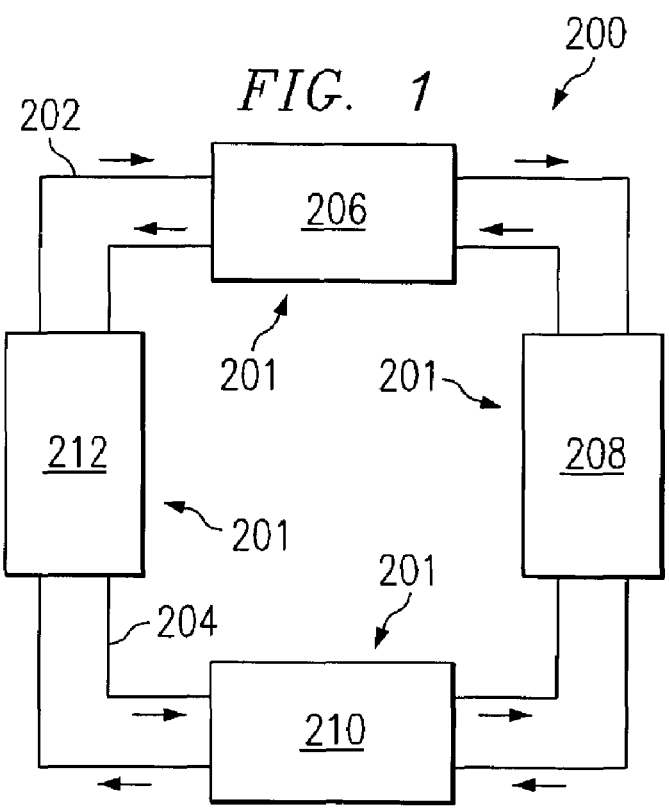
FIG. 1 is a block diagram illustrating an optical network in accordance with one embodiment of the present invention.

FIG. 1 illustrates an optical network 200 in accordance with one embodiment of the present invention. In this embodiment, the optical network 200 is a flexible open ring network.

Referring to FIG. 1, the network 200 includes a first fiber optic ring 202 and a second fiber optic ring 204 connecting nodes 206, 208, 210, and 212. As with network 10, network 200 is an optical network in which a number of optical channels are carried over a common path at disparate wavelengths. The network 200 may be a wavelength division multiplexing (WDM), dense wavelength division multiplexing (DWDM), or other suitable multi-channel network. The network 200 may be used in a short-haul metropolitan network, and long-haul inter-city network or any other suitable network or combination of networks.

In network 200, optical information signals are transmitted in different directions on the rings 202 and 204 to provide fault tolerance. The optical signals have at least one characteristic modulated to encode audio, video, textual, real-time, non-real-time and/or other suitable data. Modulation may be based on phase shift keying (PSK), intensity modulation (IM) and other suitable methodologies.

In the illustrated embodiment, the first ring 202 is a clockwise ring in which traffic is transmitted in a clockwise direction. The second ring 204 is a counterclockwise ring in which traffic is transmitted in a counterclockwise direction. The nodes 201 are each operable to add and drop traffic to and from the rings 202 and 204. As used herein, the term "each" means every one of at least a subset of the identified items. In particular, each node 201 receives traffic from local clients and adds that traffic to the rings 202 and 204. At the same time, each node 201 receives traffic from the rings 202 and 204 and drops traffic destined for the local clients. In adding and dropping traffic, the nodes 201 may multiplex data from clients for transmittal in the rings 202 and 204 and may demultiplex channels of data from the rings 202 and 204 for clients.

Traffic may be added to the rings 202 and 204 by inserting the traffic channels or otherwise combining signals of the channels into a transport signal of which at least a portion is transmitted on a ring. Traffic may be dropped by making the traffic available for transmission to the local clients. Thus, traffic may be dropped and yet continue to circulate on a ring. In a particular embodiment, traffic is passively added to and dropped from the rings 202 and 204. "Passive" in this context means the adding or dropping of channels without power, electricity, and/or moving parts. An active device would thus use power, electricity or moving parts to perform work. In a particular embodiment, traffic may be passively added to and/or dropped from the rings 202 and 206 by splitting/combining, which is without multiplexing/demultiplexing, in the transport rings and/or separating parts of a signal in the ring.

In a particular embodiment, traffic is passively added to and passively dropped from the rings 202 and 204. In this embodiment, channel spacing may be flexible in the rings 202 and 204 and the node elements on the rings 202 and 204 need not be configured with channel spacing. Thus, channel spacing may be set by and/or at the add/drop receivers and senders of the nodes 201 coupled to the client. The transport elements of the nodes 201 communicate the received traffic on the rings 202 and 204 regardless of the channel spacing of the traffic.

Each ring 202 and 204 has a terminating point such that the rings 202 and 204 are "open" rings. The opening in the rings 202 and 204 may be a physical opening, an open, crossed, or other non-closed switch, a deactivated transmission device or other obstruction operable to completely or effectively terminate, and thus remove channels from the rings 202 and 204 at the terminal points such that interference of each channel with itself due to recirculation is prevented or minimized such that the channels may be received and decoded within normal operating limits.

In one embodiment, the rings 202 and 204 are open, and thus terminate, in the nodes 201. In a particular embodiment, the rings 202 and 204 may terminate in neighboring nodes 201 at corresponding points along the rings 202 and 204. Terminal points in the rings 202 and 204 may be corresponding when, for example, they are between add and/or drop devices of two neighboring nodes or when similarly positioned within a same node. Further details regarding the open ring configuration are described below in reference to FIG. 4.

Figure 2:
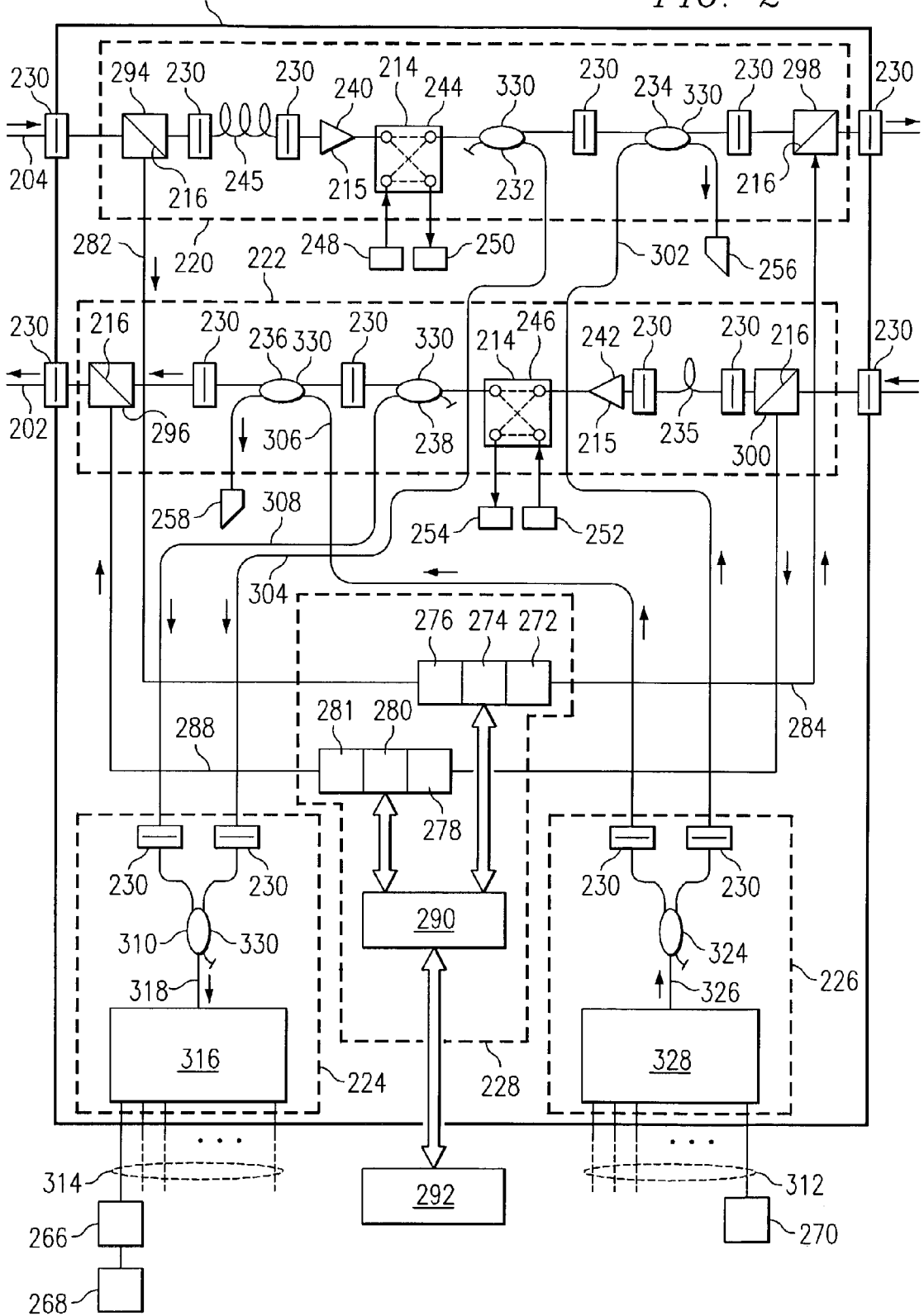
FIG. 2 is a block diagram illustrating details of the node of FIG. 1 in accordance with one embodiment of the present invention.

FIG. 2 illustrates details of the node 201 in accordance with one embodiment of the present invention. In this embodiment, optical supervisory channel (OSC) traffic is transmitted in an external band separate from the revenue-generating traffic. In a particular embodiment, the OSC signal is transmitted at a wavelength of 1510 nanometers (nm).

Figure 12A:
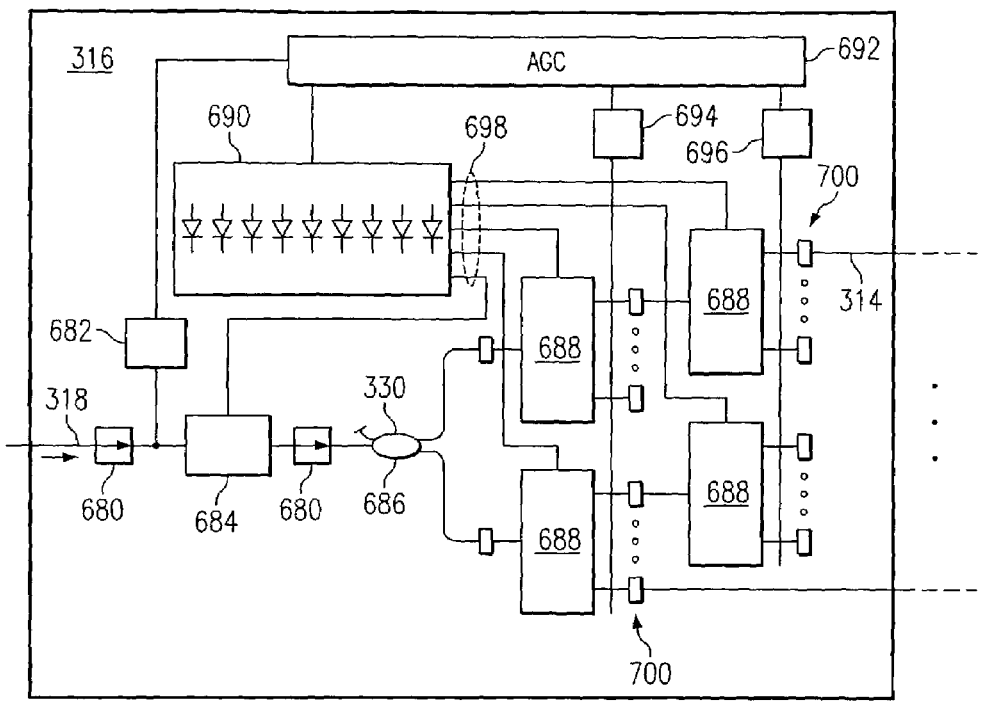
FIG. 12A is a block diagram illustrating details of a distributing amplifier of the node in FIG. 2 in accordance with one embodiment of the present invention.
Figure 12B:
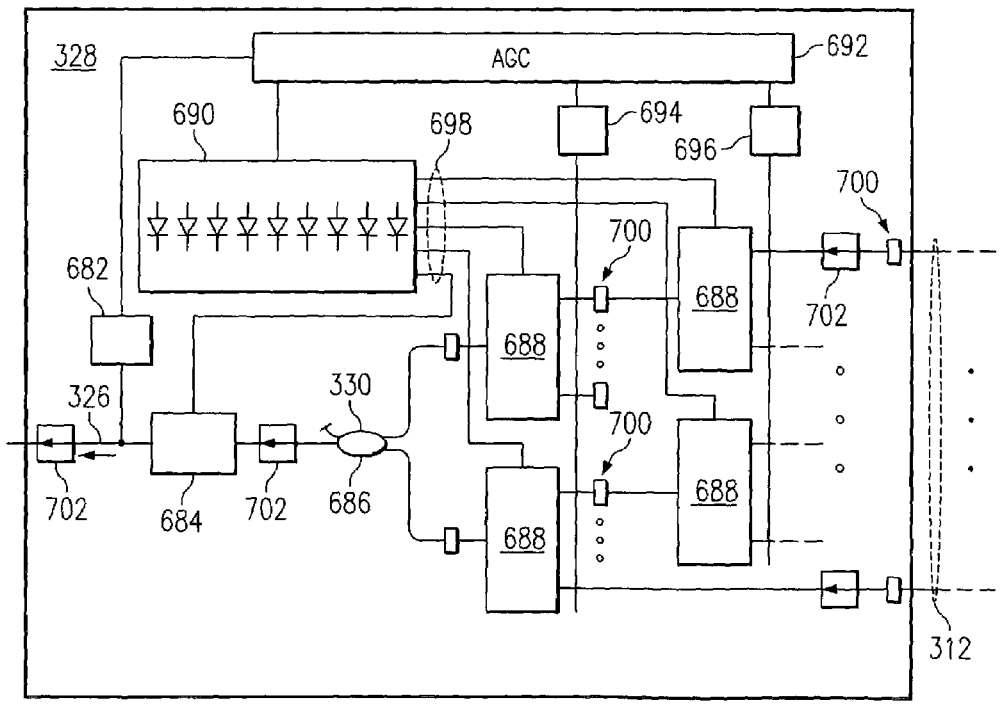
FIG. 12B is a block diagram illustrating details of a distributing combiner of the node in FIG. 2 in accordance with one embodiment of the present invention.

Referring to FIG. 2, the node 201 comprises counterclockwise transport element 220, clockwise transport element 222, distributing element 224, combining element 226, and managing element 228. In one embodiment, the elements 220, 222, 224, 226 and 228 as well as components within the elements may be interconnected with optical fiber links. In other embodiments, the components of this and other modes may be implemented in part or otherwise with planar waveguide circuits and/or free space optics. In addition, as described in connection with nodes 12, the elements of node 201 may each be implemented as one or more discrete cards within a card shelf of the node 201. Exemplary connectors 230 for a card shelf embodiment are illustrated by FIGS. 12A and 12B. The connectors 230 may allow efficient and cost effective replacement of failed components. It will be understood that additional, different and/or other connectors may be provided as part of the node 201.

Transport elements 220 and 222 may each comprise passive couplers or other suitable optical splitters/couplers 330, ring switch 214, amplifier 215, and OSC filters 216. Optical splitters/couplers 330 may comprise splitters/couplers 330 or other suitable passive device. Ring switch 214 may be a 2×2 or other switch operable to selectively open the connected ring 202 or 204. In the 2×2 embodiment, the switch 214 includes a "cross" or open position and a "through" or closed position. The cross position may allow for loopback, localized and other signal testing. The open position allows the ring openings in the nodes 201 to be selectively reconfigured to provide protection switching.

Amplifier 215 may comprise an erbium-doped fiber amplifier (EDFA) or other suitable amplifier. In one embodiment, the amplifier is a preamplifier and may be selectively deactivated to open a connected ring 202 or 204 to provide protection switching in the event of failure of the adjacent switch 214. Because the span loss of clockwise ring 202 may differ from the span loss of counterclockwise ring 204, the amplifier 215 may use automatic gain control (AGC) to realize gain-flatness against input power variation. The preamplifier 215 and the switch 214 are disposed in the transport elements 220 and 222 inside of the OSC filters 216 and between the ingress OSC filter 216 and the add/drop splitters/couplers 330. Thus, the OSC signal may be recovered regardless of the position of switch 214 or operation of preamplifier 215. In another embodiment, OSC signals may be transmitted in-band with revenue-generating traffic by placing an OSC filter between the couplers 232 and 234 and between the couplers 236 and 238. OSC filters 216 may comprise thin film type, fiber grating or other suitable filters.

In the specific embodiment of FIG. 2, counterclockwise transport element 220 includes a passive optical splitter set having a counterclockwise drop coupler 232 and a counterclockwise add coupler 234. The counterclockwise transport element 220 further includes OSC filters 294 and 298 at the ingress and egress edges, counterclockwise amplifier 240 between the ingress OSC filter 294 and drop coupler 232 and counterclockwise ring switch 244 between amplifier 240 and drop coupler 232. Thus, the switch 244 in this embodiment is on the ingress side of the transport element and/or drop coupler. The counterclockwise transport element 220 may also include a dispersion compensation fiber (DCF) segment 235 to provide dispersion control. In one embodiment, DCF segment 235 may be included where the network 200 operates at rates at or above 2.5 G and/or the previous node is greater than a short hop on the connected ring.

Clockwise transport element 222 includes a passive optical splitter set including clockwise add coupler 236 and clockwise drop coupler 238. Clockwise transport element 222 further includes OSC filters 296 and 300, clockwise amplifier 242, and clockwise ring switch 246. OSC filters 296 and 300 are disposed at the ingress and egress edges of the clockwise transport element 222. The clockwise amplifier 242 is disposed between the ingress OSC filter 300 and the drop coupler 238 while the clockwise ring switch 246 is disposed between the amplifier 242 and the drop coupler 238. Thus, the switch 246 in this embodiment is on the ingress side of the transport element and/or drop coupler. The clockwise transport element 222 may also include a DCF segment 245 to provide dispersion compensation depending, as previously discussed, on the data transport rate and/or the length of the span to the previous node.

Distributing element 224 may comprise a drop coupler 310 feeding into the distributing module (DM) 316. DM 316 is operable to split the signal from coupler 310 into a plurality of signals, amplify the signals, and forward the signals to the drop leads 314. Further details regarding DM 316 are described in reference to FIG. 12A. The drop leads 314 may be connected to one or more tunable filters 266 which in turn may be connected to one or more broadband optical receivers 268.

Combining element 226 may be a combining amplifier and may comprise a combining module (CM) 328 which may be connected to one or more add optical senders 270 via add leads 312. CM 328 is operable to combine the signal from leads 312 into a single signal, which is forwarded via fiber 326 into splitter 324. Further details regarding CM 318 are described in reference to FIG. 12B. Splitter 324 further comprises two optical fiber egress leads which feed into clockwise add segment 306 and counterclockwise add segment 302.

Managing element 228 may comprise OSC senders 272 and 281, OSC interfaces 274 and 280, OSC receivers 276 and 278, and an element management system (EMS) 290. Each OSC sender, OSC interface and OSC receiver set forms an OSC unit for one of the rings 202 or 204 in the node 201. The OSC units receive and transmit OSC signals for the EMS 290. The EMS 290 may be communicably connected to a network management system (NMS) 292. NMS may reside within node 201, in a different node, or external to all of the nodes 201.

EMS 290, NMS 292 and/or other elements or parts of the described nodes or networks may comprise logic encoded in media for performing network and/or node monitoring, failure detection, protection switching and loopback or localized testing functionality of the network 200. Logic may comprise software encoded in a disk or other computer-readable medium and/or instructions encoded in an application specific integrated circuit (ASIC), field programmable gate array (FPGA), or other processor or hardware. It will be understood that functionality of EMS 290 and/or NMS 292 may be performed by other components of the network 200 and/or be otherwise distributed or centralized. For example, operation of NMS 292 may be distributed to the EMS of nodes 201 and the NMS omitted. Similarly, the OSC units may communicate directly with NMS 292 and EMS 290 omitted.

The node 201 further comprises counterclockwise add fiber segment 302, counterclockwise drop fiber segment 304, clockwise add fiber segment 306, clockwise drop fiber segment 308, OSC fiber segments 282, 284, 286, and 288, and optical spectrum analyzer (OSA) connectors 250, 254, 256, and 258. The OSA connectors may be angled connectors to avoid reflection. Test signal may sometimes be fed into the network from connectors 248 and 252. As previously described, a plurality of passive physical contact connectors 230 may be included where appropriate so as to communicably connect the various elements of node 201.

In operation, the transport elements 220 and 222 are operable to passively add local traffic to the rings 202 and 204 and to passively drop at least local traffic from the rings 202 and 204. The transport elements 220 and 222 may further be operable to passively add and drop the OSC signal to and from the rings 202 and 204. More specifically, in the counterclockwise direction, OSC filter 294 processes an ingress optical signal from counterclockwise ring 204. OSC filter 294 filters OSC signal from the optical signal and forwards the OSC signal to the OSC interface 274 via fiber segment 282 and OSC receiver 276. OSC filter 294 also forwards or lets pass the remaining transport optical signal to amplifier 240. By placing the OSC filter 294 outside of the ring switch 244, the node 201 is able to recover the OSC signal regardless of the position of the ring switch 244.

Amplifier 240 amplifies the signal and forwards the signal to ring switch 244. Ring switch 244 is selectively operable to transmit the optical signal to coupler 232 when the ring switch 244 is set to the through (closed) setting, or to transmit the optical signal to OSA connector 250 when the ring switch 244 is set to the cross (open) setting. Further details regarding the OSA connectors are described below.

If ring switch 244 is set in the cross position, the optical signal is not transmitted to couplers 232 and 234, the ring 204 is open at the node 201, and dropping of traffic from the ring 204 does not occur at node 201. However, adding of traffic at node 201 occurs and the added traffic flows to the next node in the ring 204. If the ring switch 244 is set in the through position, the optical signal is forwarded to couplers 232 and 234 and adding and dropping of traffic to and from the ring 204 may occur at node 201.

Coupler 232 passively splits the signal from switch 244 into two generally identical signals. A passthrough signal is forwarded to coupler 234 while a drop signal is forwarded to distributing element 224 via segment 304. The signals may be substantially identical in content and/or energy. Coupler 234 passively combines the passthrough signal from coupler 232 and an add signal comprising local add traffic from combining element 226 via fiber segment 302. The combined signal is passed to OSC filter 298.

OSC filter 298 adds an OSC signal from the OSC interface 274, via the OSC sender 272 and fiber segment 284, to the combined optical signal and forward the combined signal as an egress transport signal to ring 204. The added OSC signal may be locally generated data or may be received OSC data passed through the EMS 290.

In the clockwise direction, OSC filter 300 receives an ingress optical signal from clockwise ring 202. OSC filter 300 filters the OSC signal from the optical signal and forwards the OSC signal to the OSC interface 280 via fiber segment 286 and OSC receiver 278. OSC filter 300 also forwards the remaining transport optical signal to amplifier 242.

Amplifier 242 amplifies the signal and forwards the signal to ring switch 246. Ring switch 246 is selectively operable to transmit the optical signal to coupler 238 when the ring switch 246 is set to the through setting, or to transmit the optical signal to OSA connector 254 when the ring switch 246 is set to the cross setting.

If the ring switch 246 is set in the cross position, the optical signal is not transmitted to couplers 238 and 236, the ring 204 is open at the node 201, and dropping of traffic from the ring 202 does not occur at node 201. However, adding of traffic to the ring 202 occurs at node 201. If the ring switch 246 is set in the through position, the optical signal is forwarded to couplers 238 and 236 and adding and dropping of traffic to and from the ring 202 may occur at node 201.

Coupler 238 passively splits the signal from switch 246 into generally identical signals. A passthrough signal is forwarded to coupler 236 while a drop signal is forwarded to distributing unit 224 via segment 308. The signals may be substantially identical in content and/or energy. Coupler 236 passively combines the passthrough signal from coupler 238 and an add signal comprising local add traffic from combining element 226 via fiber segment 306. The combined signal is passed to OSC filter 296.

OSC filter 296 adds an OSC signal from the OSC interface 280, via the OSC sender 281 and fiber segment 288, to the combined optical signal and forwards the combined signal as an egress transport signal to ring 202. As previously described, the OSC signal may be locally generated data or data passed through by EMS 290.

Prior to addition to the rings 202 and 204, locally-derived traffic is transmitted by a plurality of add optical senders 270 to combining element 226 of the node 201 where the signals are combined, amplified, and forwarded to the transport elements 220 and 222, as described above, via counterclockwise add segment 302 and clockwise add segment 306. The locally derived signals may be combined by the optical coupler 324, by a multiplexer or other suitable device.

Locally-destined traffic is dropped to distributing element 224 from counterclockwise drop segment 304 and clockwise drop segment 308. Distributing element 224 splits the drop signal comprising the locally-destined traffic into multiple generally identical signals and forwards each signal to an optical receiver 268 via a drop lead 314. The signal received by optical receivers 268 may first be filtered by filters 266. Filters 266 may be tunable filters or other suitable filters and receivers 268 may be broadband or other suitable receivers.

EMS 290 monitors and/or controls all elements in the node 201. In particular, EMS 290 receives an OSC signal in an electrical format via OSC filters 294, 296, 298 and 300, OSC receivers 276 and 278, OSC senders 272 and 281, and OSC interfaces 274 and 280. EMS 290 may process the signal, forward the signal and/or loopback the signal. Thus, for example, the EMS 290 is operable to receive the electrical signal and resend the OSC signal to the next node, adding, if appropriate, node-specific error information or other suitable information to the OSC.

In one embodiment each element in a node 201 monitors itself and generates an alarm signal to the EMS 290 when a failure or other problem occurs. For example, EMS 290 in node 201 may receive one or more of various kinds of alarms from the elements and components in the node 201: an amplifier loss-of-light (LOL) alarm, an amplifier equipment alarm, an optical receiver equipment alarm, optical sender equipment alarm, a distributing amplifier LOL alarm, a distributing amplifier equipment alarm, a combining amplifier LOL alarm, a combining amplifier equipment alarm, or other alarms. Some failures may produce multiple alarms. For example, a fiber cut may produce amplifier LOL alarms at adjacent nodes and also error alarms from the optical receivers.

In addition, the EMS 290 may monitor the wavelength and/or power of the optical signal within the node 210 via connections (not shown) between the OSA connectors 250, 254, 256, and 258 and an optical spectrum analyzer (OSA) communicably connected to EMS 290.

The NMS 292 collects error information from all of the nodes 201 and is operable to analyze the alarms and determine the type and/or location of a failure. Based on the failure type and/or location, the NMS 292 determines needed protection switching actions for the network 200. The protection switch actions may be carried out by NMS 292 by issuing instructions to the EMS 290 in the nodes 201. After a failure is fixed, the network 200 does not require reverting. Thus, the open ring network configuration does not change for protection switching, only the location of the openings. In this way, network operation is simplified and node programming and operation is cost minimized or reduced.

Error messages may indicate equipment failures that may be rectified by replacing the failed equipment. For example, a failure of one of the amplifiers in the distributing element may trigger a distributing amplifier alarm. The failed amplifier can then be replaced. A failed coupler in the distributing element may be likewise detected and replaced. Similarly, a failure of an optical receiver or sender may trigger an optical receiver equipment alarm or an optical sender equipment alarm, respectively, and the optical receiver or sender replaced as necessary. The optical sender should have a shutter or cold start mechanism. Upon replacement, no other switching or reversion from a switched state may be required. As described further below in reference to FIGS. 16 and 18, the NMS 292 may in response to certain messages or combinations of messages trigger a protection switching protocol.

The configuration of node 201 may be suitably varied without departing from the present invention. For example, in our embodiment, redundant ring switches may be provided in each of the transport elements. The redundant ring switches may allow for continued circuit protection in the event of switch failure and failed ring switches may be replaced without interfering the node operations or configuration. Ring switch failure may comprise, among other things, failure of a ring switch to change from the cross position to a through position, failure of a ring switch to change from a through position to the cross position, or the switch becoming fixed in an intermediate position. The redundant ring switches may thus allow for protection switching in the event that a switch fails to switch from the closed position to the open position. Furthermore, the cascaded switch configuration allows a switch operation test, because whenever one of the switches has the cross position, the other switches' position does not affect the network traffic. Alternatively, redundancy in the event of a switch stuck in the closed position can be accomplished without a redundant switch by turning off the amplifier for that ring in the node with the failed switch, thus effectively terminating the signal at the amplifier.

In still another embodiment, the combining element may comprise switches operable to selectively transmit an optical signal to the clockwise ring, to the counterclockwise ring, or to both rings. In this embodiment, the switches may be configured so as to allow for the transmission of add traffic to both transport elements even in the event of a failure of one of the amplifiers 326 and 328. In another embodiment, a single coupler may be used to add and direct traffic in each transport element.

Figure 3:
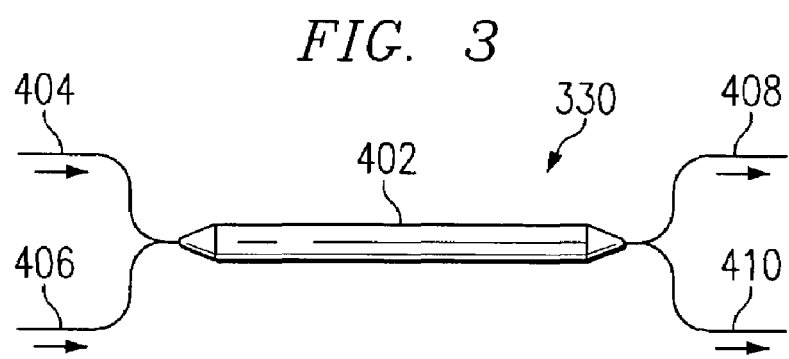
FIG. 3 is a block diagram illustrating details of an optical coupler of the node of FIG. 2 in accordance with one embodiment of the present invention.

FIG. 3 illustrates details of an optical splitter/coupler 330 in accordance with one embodiment of the present invention. The optical splitter/coupler 330 may in other embodiments be combined in whole or in part with a waveguide circuit and/or free space optics. In the illustrated embodiment, the optical splitter/coupler 330 is a fiber coupler with two inputs and two outputs (a 2:2 splitter). It will be understood that in accordance with other embodiments of the present invention the splitter/coupler 330 may include one or any number of any suitable inputs and outputs and that the splitter/coupler 330 may comprise a greater number of inputs than outputs or a greater number of outputs than inputs. For example, 3:3 splitter/couplers are used as splitter/couplers 750 in the embodiment shown in FIG. 15D. As discussed herein, splitter/couplers 330 are utilized in various embodiments of the present invention as splitters, as couplers, and/or as pump combiners.

Referring to FIG. 3, the optical splitter/coupler 330 comprises a cover frame 402, first entry segment 404, second entry segment 406, first exit segment 408, and second exit segment 410.

First entry segment 404 and first exit segment 408 comprise a first continuous optical fiber. Second entry segment 406 and second exit segment 410 comprise a second continuous optical fiber. Outside of the cover frame 402, segments 404, 406, 408, and 410 may comprise a jacket, a cladding, and a core fiber. Inside the cover frame 402, the jacket and cladding may be removed and the core fibers twisted, coupled, or fused together to allow the transfer of optical signals and/or energy of the signals between and among the first and second continuous optical fibers. In this way, the optical splitter/coupler 330 passively combines optical signals arriving from entry segments 404 and 406 and passively splits and forwards the combined signal via exit segments 408 and 410. A plurality of signals may be combined and the combined signal split by combining and thereafter splitting the combined signal or by simultaneously combining and splitting the signals by transferring energy between fibers.

The optical splitter/coupler 330 provides flexible channel-spacing with no restrictions concerning channel-spacing in the main streamline. The splitter/coupler 330 may split the signal into two copies with substantially equal power. "Substantially equal" in this context means ±25%. In a particular embodiment, the coupler has a directivity of over −55 dB. Wavelength dependence on the insertion loss is less than about 0.5 dB. The insertion loss for a 2:2 coupler may be less than about −3.5 dB, and that for a 3:3 coupler may be less than about −5 dB.

Figure 4:
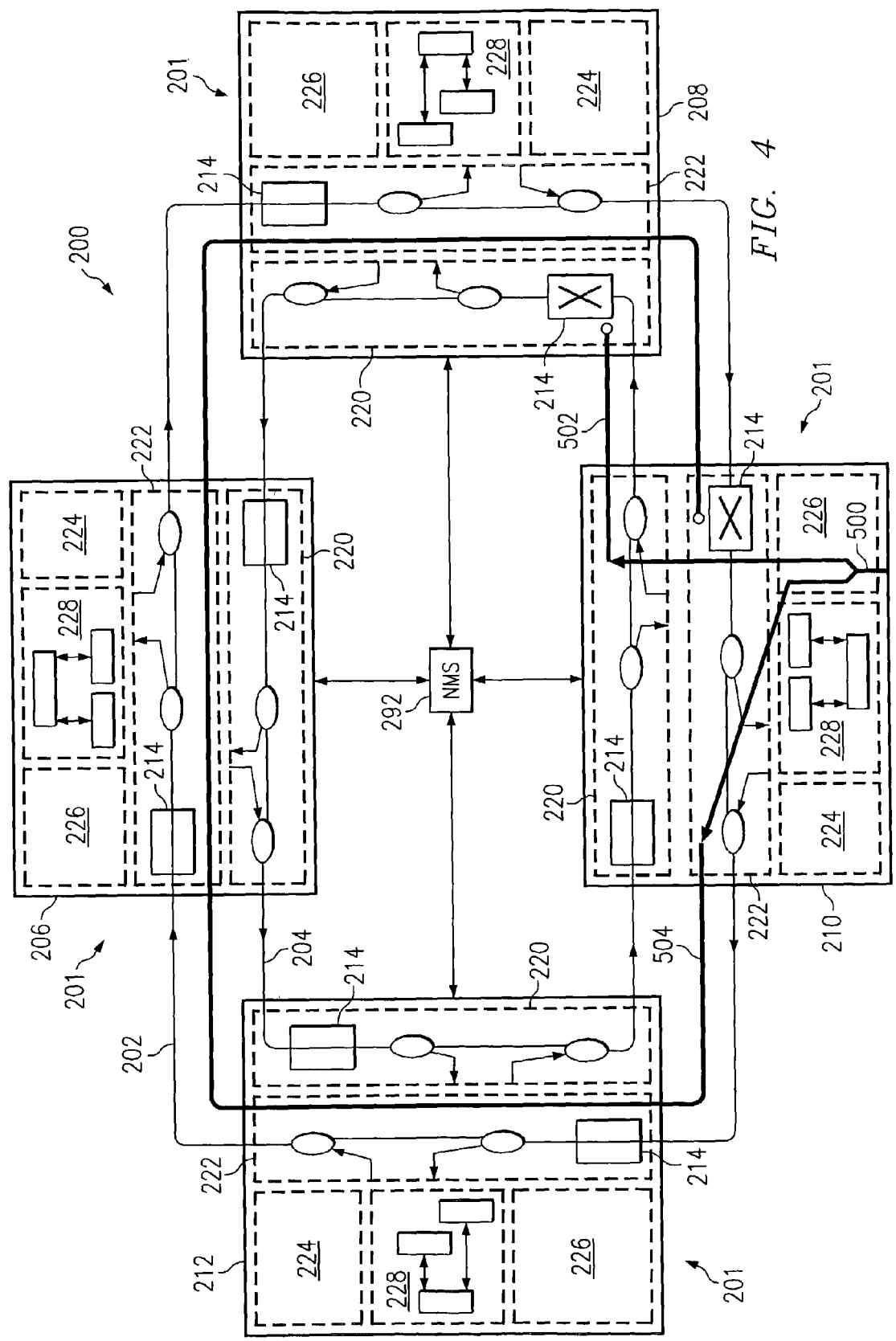
FIG. 4 is a block diagram illustrating the open ring configuration and light path flow of the optical network of FIG. 1 in accordance with one embodiment of the present invention.

FIG. 4 illustrates the optical network 200 with high level details of the nodes 206, 208, 210 and 212. As previously described, each node includes a counterclockwise transport element 220, a clockwise transport element 222, a distributing element 224, a combining element 226, and a managing element 228. The transport elements add and/or drop traffic to and from the rings 202 and 204. The combining element 226 combines ingress local traffic to generate an add signal that is provided to the transport elements 220 and 222 for transmission on the rings 202 and 204. The distributing element 224 receives a dropped signal and recovers local egress traffic for transmission to local clients. The managing element 228 monitors operation of the node 201 and/or network 200 and communicates with a NMS 292 for the network 200.

Referring to FIG. 4, each node 206, 208, 210 and 212 includes a ring switch 214 in each transport element 220 and 222 that is controllable to selectively open or close the connected ring 202 or 204 prior to the dropping or adding of traffic by the transport element 220 or 222 in the node. The ring switches 214 may be otherwise suitably positioned within one or more or each node 201 prior to the dropping and/or adding of traffic at an inside or outside edge of the node 201 or between the node and a neighboring node 201.

During normal operation, a single ring switch 214 is crossed or otherwise open in each ring 202 and 204 while the remaining ring switches 214 are closed. Thus, each ring 202 and 204 is continuous or otherwise closed except at the ring switch 214 that is open. The ring switches 214 that are open in the rings 202 and 204 together form a switch set that effectively opens the rings 202 and 204 of the network 200 in a same span and/or corresponding point of the network 200. A same span is opened in the network 200 in that, for example, the nodes 201 neighboring the span do not receive ingress traffic from the span. Such alignment of the open ring switches 214 in, along or at the periphery of a span allows each node 201 to communicate with each other node 201 in the network 200 while avoiding or minimizing interference from circulating traffic.

In the illustrated embodiment, ring switch 214 in the clockwise transport element 222 of node 210 is crossed, as is ring switch 214, in the counterclockwise transport element 220 of node 208. The remaining ring switches 214 are closed to a through position. A traffic channel 500 added at node 210 travels around the rings 202 and 204 in exemplary light paths 502 and 504. In particular, a counterclockwise light path 502 extends from the combining element 226 of node 210 to the counterclockwise transport element 220 where it is added to counterclockwise ring 204. On counterclockwise ring 204, light path 502 extends to node 208 where it is terminated by the crossed ring switch 214 of the counterclockwise transport element 220. Clockwise light path 504 extends from the combining element 226 of node 210 to the clockwise transport element 222 of node 210 where it is added to clockwise ring 202. On clockwise ring 202, light path 504 extends to ring 212, through the clockwise transport element 222 of ring 212, to ring 206, through the clockwise transport element 222 of ring 206, to node 208, through the clockwise transport element 222 of node 208, and back to node 210 where it is terminated by the crossed ring switch 214 on the ingress side of the clockwise transport element 222. Thus, each node 206, 208, 210 and 212 is reached by each other node from a single direction and traffic is prevented from circulating around either ring 202 and 204 or otherwise causing interference.

Figure 5:
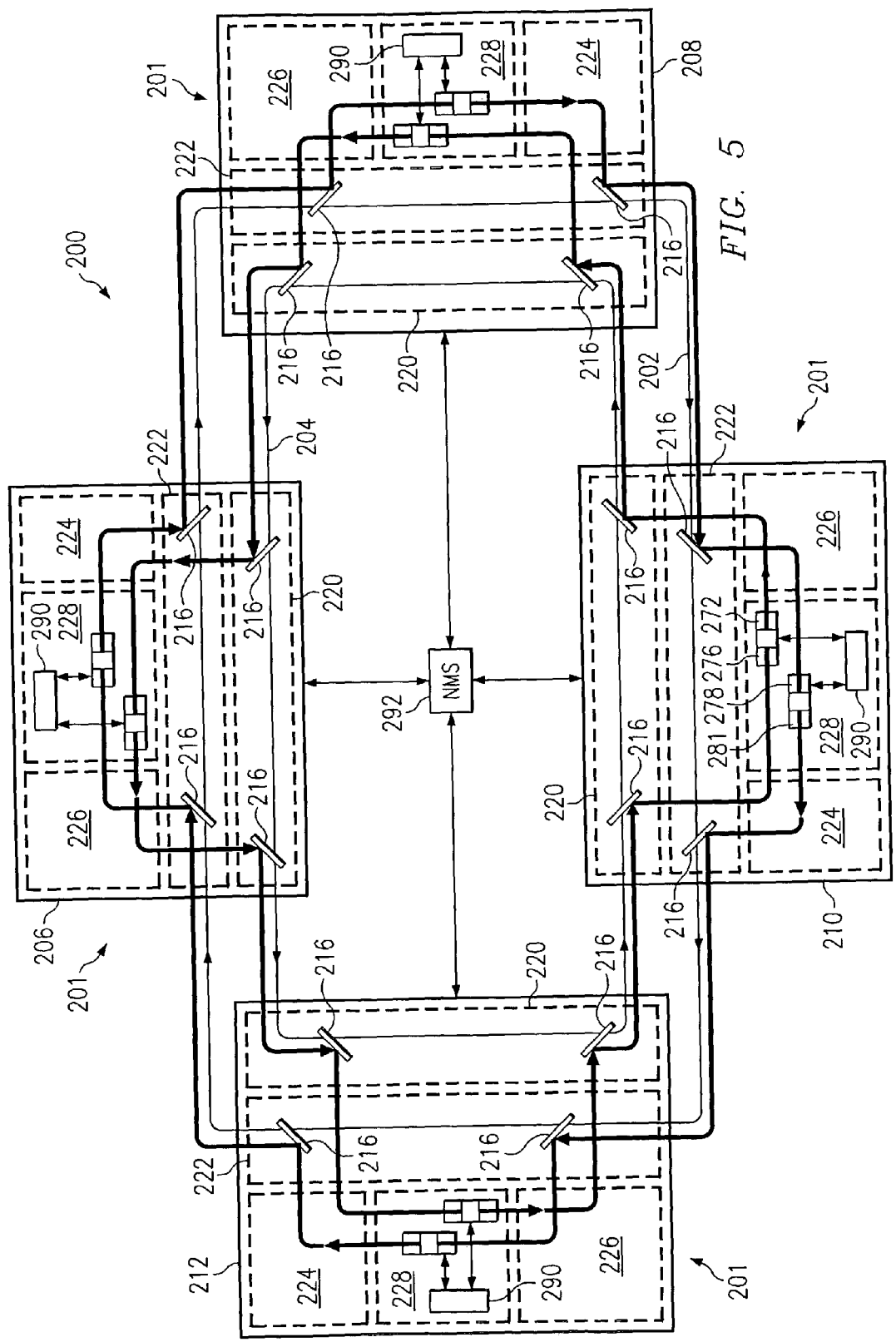
FIG. 5 is a block diagram illustrating the optical supervisory channel (OSC) flow in the optical network of FIG. 1 in accordance with one embodiment of the present invention.

FIG. 5 illustrates the optical network 200 with high level details of the nodes 206, 208, 210 and 212. The nodes each include the counterclockwise and clockwise transport elements 220 and 222 as well as the combining element 224, distributing element 226, and managing element 228. In addition to adding and dropping traffic channels to and from the rings 202 and 204, the transport elements 220 and 222 add and drop the OSC to and from the rings 202 and 204 for processing by managing element 228.

Referring to FIG. 5, as previously described, the transport elements 220 and 222 include an OSC filter 216 at an ingress point prior to the ring switches 214 to filter out and/or otherwise remove the OSC from the rings 202 and 204. In each node 201, the OSC signal from each ring 202 and 204 is passed to corresponding optical receiver 276 and 278 of the OSC unit for processing by EMS 290. In addition, the OSC signal generated by the EMS 290 for each ring 202 and 204 is transmitted by the optical sender 272 or 281 onto the corresponding ring 202 and 204 for transmission to the next node 201.

In normal operation, each node 201 receives an OSC signal from the neighboring nodes along the rings 202 and 204, processes the signal and passes the OSC signal on and/or adds its own OSC signal for transmission to the neighboring nodes.

Placement of the OSC filters 216 at the periphery of the transport elements 220 and 222 outside the ring switches 214 allows each node 201 to receive the OSC signal from its neighboring or adjacent nodes 201 regardless of the open/close status of its ring switches 214. If the OSC filters are inside the ring switches 214, for example in embodiments where the ring switches 214 are outside of the nodes 201, the OSC signals may be looped back between rings 202 and 204 at the edges of the open span. For example, for the illustrated embodiment, the EMS 290 of node 208 may pass received OSC information destined for node 210 from the clockwise OSC unit to the counterclockwise OSC unit for transmission to node 210 on the counterclockwise ring 204. Similarly, OSC information received at node 210 and destined for node 208 may be passed by the EMS 290 of node 210 from the counterclockwise OSC unit to the clockwise OSC unit for transmission to node 208 on the clockwise ring 202.

Figure 6:
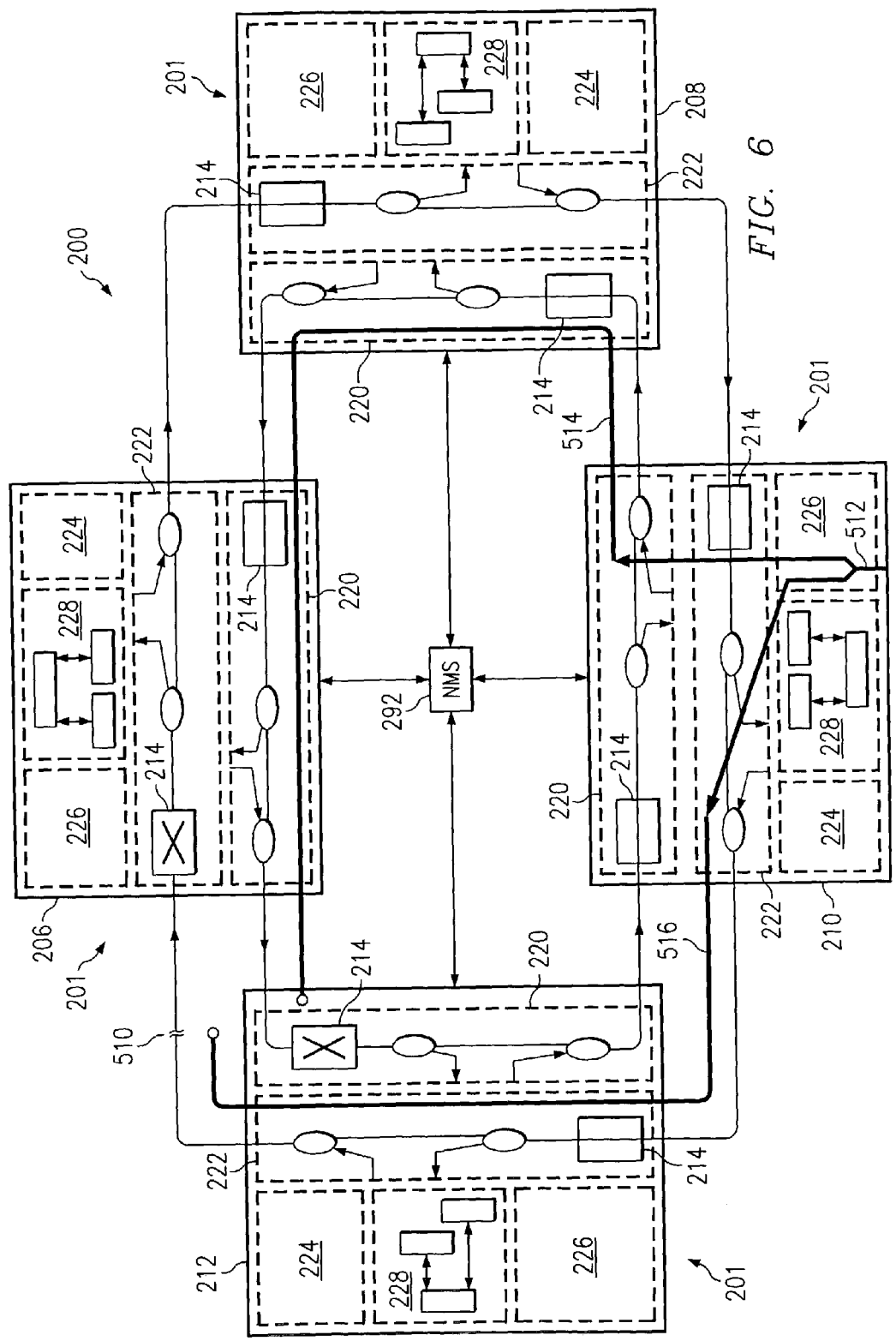
FIG. 6 is a block diagram illustrating protection switching and light path protection in the optical network of FIG. 1 in accordance with one embodiment of the present invention.

FIG. 6 illustrates protection switching and light path protection for network 200 in accordance with one embodiment of the present invention. As previously described, each node 206, 208, 210, and 212 includes clockwise and counterclockwise transport elements 220 and 222 as well as the combining, distributing and managing elements 224, 226, and 228. The managing elements each communicate with NMS 292.

Referring to FIG. 6, a fiber cut 510 is shown in ring 204 between nodes 206 and 212. In response, as described in more detail below, the NMS 292 opens the ring switch 214 in counterclockwise transport element 220 of node 212 and the ring switch 214 in clockwise transport element 222 of node 206, thus effectively opening the span between nodes 206 and 212. After opening the rings 202 and 204 on each side of the break, the NMS 292 closes any previously open ring switches 214 in the nodes 201.

After protection switching, each node 201 continues to receive traffic from each other node 201 in network 200 and an operable open ring configuration is maintained. For example, a signal 512 originated in node 210 is transmitted on counterclockwise light path 514 to nodes 208 and 206 and transmitted on clockwise light path 516 to node 212. In one embodiment, the NMS 292, EMS 290 and the 2×2 ring switches 214 may be configured for fast protection switching with a switching time of less than 10 milliseconds.

FIG. 7 is a flow diagram illustrating a method for protection switching of an open ring optical network in accordance with one embodiment of the present invention. In this embodiment, the optical network may be network 200 including a plurality of nodes each having a ring switch at or proximate to an ingress point of each connected ring. The method may be used in connection with other suitable network and node configurations.

Referring to FIG. 7, the method begins at step 550 with the detection by the NMS 292 of a fiber cut of ring 202 or 204 of the network 200. The NMS 292 may detect and locate the fiber cut based on the OSC and/or other signals communicated by the node EMSs 290 to the NMS 292.

At step 552, the NMS 292 issues a command to the EMS 290 in the node 201 immediately clockwise of the cut to open the clockwise ring switch 246 in the clockwise transport element 222, thus opening the clockwise ring 202 at that node 201.

At step 554, the NMS 292 issues a command to the EMS 290 in the node 201 immediately counterclockwise of the cut to open the counterclockwise ring switch 244 in the counterclockwise transport element 220, thus opening the counterclockwise ring 204 at that node 201.

At step 556, any other ring switches 214 in the nodes 201 of the network 200 are closed. Thus, each ring 202 and 204 is essentially continuous with a single open point and/or segment. The open segment may be at a discrete switch and/or transmission element or may include part, all or even more than a span between nodes of the network 200. It will be understood that additional switches 214 in the rings 200 and/or 204 may remain open and transmission elements in the rings 202 and/or 204 may be turned off so long as, in one embodiment, each node 201 is able to communicate with each other node 201 through one of the rings 202 or 204.

An example of protection switching is illustrated by FIGS. 4 and 6. Referring back to FIG. 4, for example, the clockwise and counterclockwise rings 202 and 204 of network 200 are open in the transport elements 222 and 220 of nodes 210 and 208, respectively. In response to at least a ring cut 510 as illustrated by FIG. 6, protection switching crosses ring switch 214 and clockwise transport element 222 of node 206 and ring switch 214 of counterclockwise transport element 220 of node 212. Thus, in FIG. 6 the clockwise and counterclockwise rings 202 and 204 are opened at nodes 206 and 212, respectively. The previously crossed ring switches in nodes 208 and 210 are closed to a through position to allow each node 201 to continue to receive traffic from each other node 201 in the network 200. The fiber cut 510 may be repaired at a convenient time after protection switching is completed. Furthermore, it should be noted that, after repair of the fiber cut 510, there is no need to revert the switches 214 and nodes 201 to their pre-cut states. For example, the network initially configured as shown in FIG. 4 that is then configured as shown in FIG. 6 due to fiber cut 510, may remain configured as shown in FIG. 6 even after the cut 510 has been repaired. In this way, the steps shown in FIG. 7 may be repeated for any number of fiber cut events.

As previously described, the ring switches 214 and the nodes 201 may be reconfigured to provide protection switching in response to other types of network failures that would otherwise prevent one node 201 from communicating local and/or other traffic to a neighboring node 201. For example, in response to a failure of a unit within clockwise transport segment 222 of node 206, the failed unit may be turned off (if appropriate) and the adjacent ring switch 246 actuated from a closed, or through position to an open, or cross position. As previously described, a crossed ring switch 214 terminates traffic on the connected ring 202 or 204 but may pass the traffic to the OSAs for monitoring by the EMS 290 and/or for loop back and other types of testing. Next, the ring switch 214 of the counterclockwise transport element 220 in node 212 may also be repositioned to the crossed position.

After the ring switches are crossed, the previously crossed ring switches 214 are closed to a through position to allow each node 201 to fully communicate with each other node 201. During continued operation, the failed unit may be replaced and proper operation of the new unit confirmed with loopback and/or localized testing as described in more detail below. After the failed unit is replaced and proper operation is confirmed, the network 200 may be left in the current configuration, reverted to the previous configuration or configured to yet another configuration to support localized and/or loopback testing within the network 200.

A failure of an amplifier in the combining element 226 may be detected by an equipment alarm for a combining amplifier. For example, in response to an equipment alarm for a combining amplifier in the combining element 226 of the clockwise transport element 222 of node 210, the ring switch 246 of clockwise transport element 222 in node 212 may be crossed and the ring switch 244 in the counterclockwise transport element 220 of node 210 may also be crossed. Previously opened ring switches 214 are at the same time closed and the failed combining amplifier unit in node 210 replaced and tested to confirm proper operation.

In one embodiment, a test signal may be inserted into the network and transmitted on the clockwise and/or counterclockwise rings. The signal may be terminated at a crossed ring switch 214 and transmitted via port 248 or 252 of FIG. 6 to the OSA for analysis. By selectively closing the ring switches in the appropriate nodes, a selected light path may be tested with the OSA.

Likewise, in yet another embodiment, a localized area may be defined as necessary for light path or component testing, repair or replacement. To isolate the elements of the localized area from the rest of the in-service network, the clockwise ring switches 214 of a first node and the counterclockwise ring switch of a second node are opened. The localized area thus includes the opposite parts of two neighboring nodes such that, in one embodiment, a localized area may be defined covering any device of the node in the network. Thus, testing, replacement, and/or repair of components within the localized area may be conducted without interfering with the in-service network.

In certain circumstances, it may be desirable to test a light path originating from a combining element through the add coupler of a first node, transmitted around a ring through a plurality of nodes, and returning through the drop coupler of the first node to the distributing element of the first node. In this way, all the elements of each transport segments of a given ring direction of each node may be tested. Such a light path may be created by physically separating the optical fiber at a point between the add coupler and the drop coupler of a transport segment of the first node.

Figure 8:
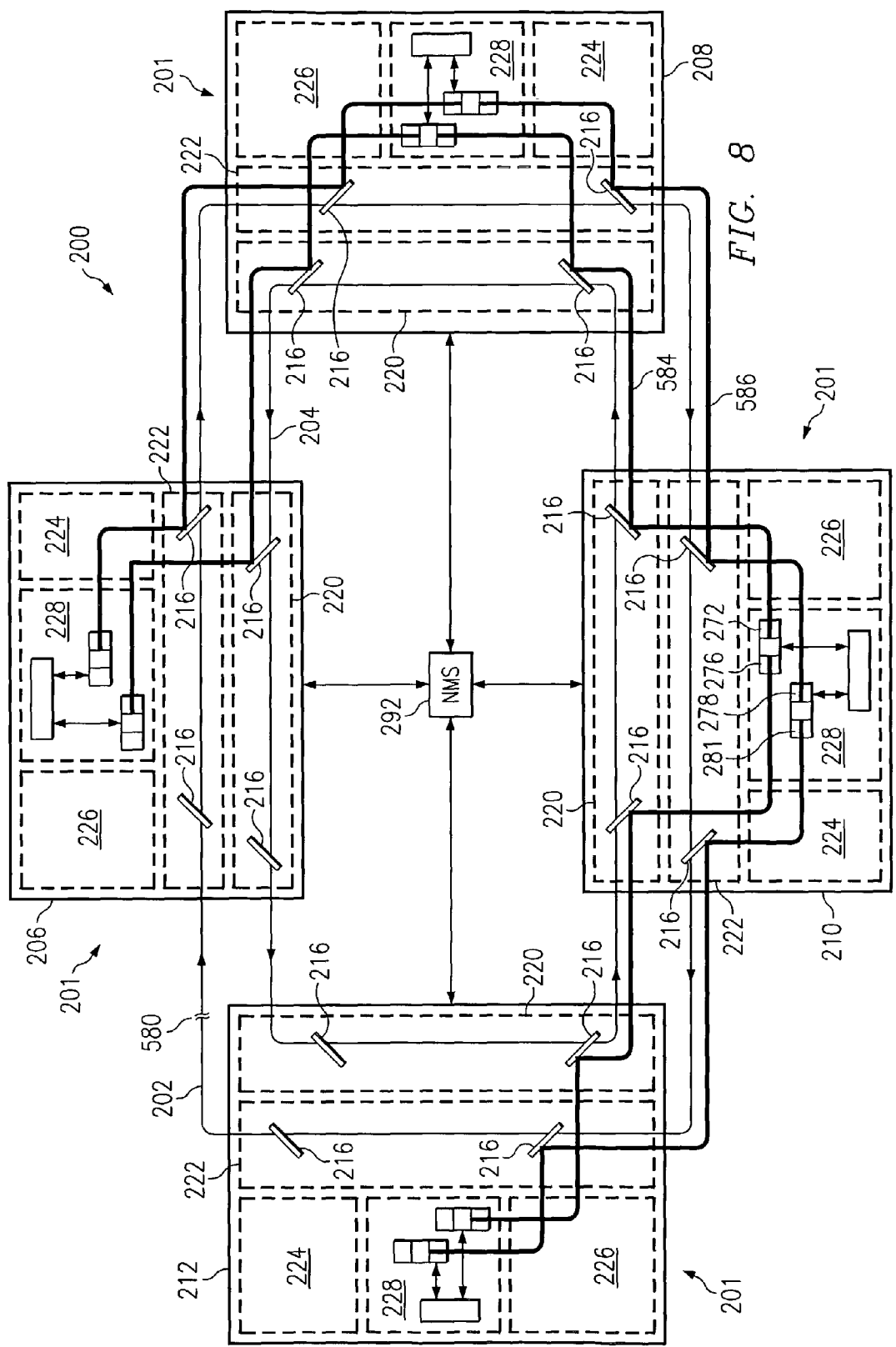
FIG. 8 is a block diagram illustrating OSC protection in the optical network of FIG. 1 in response to a line cut in accordance with one embodiment of the present invention.

FIG. 8 illustrates OSC protection for network 200 in response to a line cut in accordance with one embodiment of the present invention. In this embodiment, optical-electrical loopback in the managing elements 228 of the nodes 201 is used for protection of OSC.

Referring to FIG. 8, a fiber cut or other line break 580 is shown in clockwise ring 202 between nodes 206 and 212. In response to the fiber cut 580, an optical electrical loopback 582 is established from the counterclockwise OSC system to the clockwise OSC system through EMS 290 in node 206 and from the clockwise OSC system to the counterclockwise OSC system through EMS 290 in node 212.

In a specific embodiment, the optical-electrical loopback in node 206 comprises receiving at the counterclockwise OSC unit of the managing element 228 of node 206 the OSC 584 from the counterclockwise ring 204 and processing the OSC at the EMS 290 as described above in reference to FIG. 2. However, instead of transmitting the processed OSC as an egress signal on the counterclockwise ring 204 from node 206, the processed OSC is transmitted from the EMS 290 to the clockwise OSC unit and then onto clockwise ring 202, therefore looping the OSC back to node 206 from a counterclockwise to a clockwise signal.

Similarly, the optical-electrical loopback in node 212 comprises receiving at the clockwise OSC unit of the management element 228 of node 212 the OSC 586 from the clockwise ring 202 and processing the OSC at the EMS 290 as described above in reference to FIG. 2. However, instead of transmitting the processed OSC as an egress signal on the clockwise ring 202 from node 212, the processed OSC is transmitted from the EMS 290 to the counterclockwise OSC unit and then to counterclockwise ring 204, therefore looping the OSC back to node 212 from a clockwise to a counterclockwise signal. In this way, each node 201 in the network 200 continues to receive the OSC from each other node 201 in the network 200. The optical-electrical loopback 582 may be used during normal or protection-switched operations and may be used when the OSC signal is transmitted in-band or in another embodiment which the OSC signal passes through the ring switches 214.

The OSC flow procedure is the same for both the normal and the protection-switching scenarios. For example, in FIG. 5, if a ring switch 214 in the counterclockwise transport element 220 of the node 208 and a ring switch 214 in the clockwise element 222 have the cross positions shown in FIG. 4, it may be wise to deploy the optical-electrical loopbacks from clockwise to counterclockwise in the node 208 and from counterclockwise to clockwise in node 220.

FIG. 9 illustrates a method for OSC protection switching in an optical network in accordance with one embodiment of the present invention. In this embodiment, protection switching is implemented in response to a fiber cut. How-ever, it will be understood that OSC protection switching may be implemented in response to other types of failures and may be implemented in conjunction with light path protection switching.

Referring to FIG. 9, the method begins at step 600 with the detection by the NMS 292 of a fiber cut 580 in a span of a ring 202 or 204 of the optical network 200. The NMS 292 may detect the failure based on OSC and/or other signals from EMS 290 of the nodes 201.

At step 602, the NMS 292 issues a command to the EMS 290 in the node 201 immediately clockwise of the cut 580 to form an electrical loopback from the counterclockwise OSC unit to the clockwise OSC unit, thus creating, as described above, an optical-electrical loopback of the OSC from the counterclockwise ring 204 to the clockwise ring 202. Of course, the EMS 290 in the node 206 may detect the fiber cut 580 and execute this electrical loopback without the command from NMS 292.

At step 604, the NMS 292 issues a command to the EMS 290 in the node 201 immediately counterclockwise of the cut to form an electrical loopback from the clockwise OSC unit to the counterclockwise OSC unit, thus creating, as described above, an optical-electrical loopback of the OSC from the clockwise ring 202 to the counterclockwise ring 204. It will be understood that in this and other forms of protection switching, the NMS 292 may itself directly control devices in the nodes 201, may otherwise communicate with the devices to provide protection switching and/or the managing elements 228 of the nodes 201 may communicate among themselves to provide the functionality of the NMS 292.

At step 606, any other nodes 201 containing loopbacks that may have been previously formed are reverted to a non-loopbacked state. Or, if the OSC optical-electrical loopback procedure is deployed in nodes which have the ring switch in the cross-position, the reverting is not required. In this way, OSC data may continue to be transmitted by and received and processed at each node 201 in the network 200. After completion of the method, the fiber cut 580 may be repaired and tested. Also as above, after repair of the fiber cut 580, there is no need to revert the network 200 to its pre-switch state.

Figure 10:
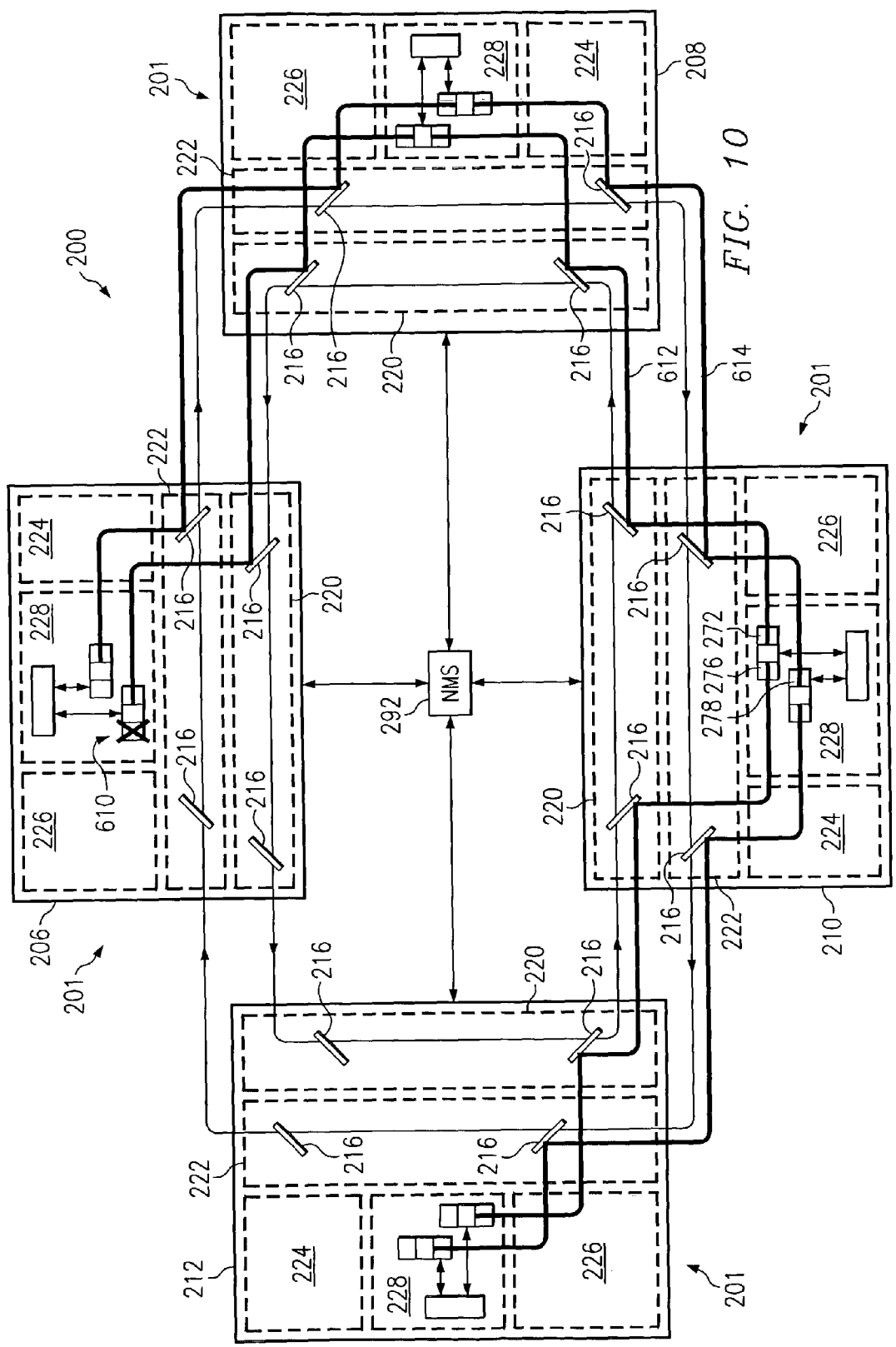
FIG. 10 is a block diagram illustrating OSC protection in the optical network of FIG. 1 in response to an OSC equipment failure in accordance with one embodiment of the present invention.

FIG. 10 illustrates OSC protection switching in the network 200 in response to an OSC equipment failure in accordance with one embodiment of the present invention. In this embodiment, protection switching is implemented for failure of an OSC sender. Failure of an OSC filter 216 or an OSC receiver 276 or 278 may necessitate similar protection switching so that each node 201 may continue to be serviced by OSC data even in the event of an equipment failure.

Referring to FIG. 10, counterclockwise OSC sender 281 of node 206 is detected as having failed. In a particular exemplary embodiment, a failure of an OSC optical sender 272 or 281 or an OSC optical receiver 276 or 278 may be detected by the NMS 292 or EMS 290 in the node 206 based on an LOL alarm for the optical receiver or a downstream optical receiver with or without another failure alarm. For example, an equipment alarm for the optical sender 281 in the counterclockwise OSC unit of the managing element 282 of node 206 would indicate a failure 610 of that optical sender. In response, the NMS 292 or EMS 290 in the node 206 may loopback counterclockwise OSC 612 to clockwise OSC at node 206. At node 212, the NMS 292 loopbacks the clockwise OSC 614 to the counterclockwise OSC. Any previous loopbacks in nodes 208 and/or 210 are broken and the information sent through the nodes.

After protection switching, the failed optical sender 281 may be replaced and thereafter tested using clockwise OSC. After confirming operation of the replaced optical sender 281, the network 200 may continue to operate in its present state or may revert to the initial OSC state. As previously discussed, for a fiber cut between nodes 206 and 210 the same procedure may be followed with the fiber cut repaired and tested.

FIG. 11 illustrates a method for inserting a node 201 into the optical network 200 in accordance with one embodiment of the present invention. Node insertion may take full advantage of the scalability in the design of network 200. Other suitable elements may be similarly inserted between the existing nodes 201 of the optical network 200.

Referring to FIG. 11, the method begins with step 650 wherein the clockwise ring switch 214 is opened in the node 201 immediately clockwise of the insertion point for the new node. Proceeding to step 652, the counterclockwise ring switch 214 is opened in the node 201 immediately counterclockwise of the insertion point. At step 654, any other open ring switches 214 are closed. Thus, the nodes 201 of the network 200 may each communicate with each other without communicating across a span in which the new node is to be added.

Proceeding to step 656, the new node is inserted at the insertion point. Such insertion may require the physical separation of the clockwise and counterclockwise optical ring fibers. At step 658, the operation of amplifiers, switches, and other elements of the new node may be checked and tested.

Proceeding to step 660, the counterclockwise switch 214 in the new node is opened. At step 662, the counterclockwise switch 214 is closed in the node 201 immediately counterclockwise of the new node. In this way, the counterclockwise ring 204 is open at the new node and the clockwise ring 202 is open at the node 201 immediately clockwise of the new node. In another embodiment, the clockwise switch 214 in the new node may be opened and the clockwise switch 214 in the node immediately clockwise of the new node may be closed.

FIGS. 12A and 12B illustrate details of DM 316 and CM 328, respectively, of the node of FIG. 2 accordance with one embodiment of the present invention. As described below, the DM and the CM may comprise a similar combination of elements such that, for example, a DM may, with only minor modifications, be used as a CM, and vice-versa. DM 316 and CM 328 preserve flexible channel spacing and signal power while distributing traffic using passive, relatively simple and inexpensive node components. Flexible channel spacing may enable a network to, among other things, accommodate various date-rate services and various modulation schemes. The DM 316 and CM 328 may be appropriate for use with broadcasting, multicasting, cable TV, or other suitable applications and may be suitable for signals transmitted in the O-band, the E-band, the S-band, the C-band, the L-band, or other portions of the optical spectrum. The multiple signals distributed or combined by DM 316 or CM 328 may differ in power or energy levels or may otherwise differ from each other. In one embodiment, the content of the distributed or combined signals is substantially the same.

Referring to FIG. 12A, the DM 316 comprises a lead-in optical fiber 318, isolators 680, a photonic detection module 682, a pre-amplification module 684, a splitter 686, amplified splitter stage modules (ASSMs) 688, ports 700, automatic gain control (AGC) module 692, photonic detection module 694, and photonic detection module 696.

Laser pump bank 690 may comprise a plurality of 1.48 micrometer and/or 0.98 micrometer laser light pumps. A 1.48 micrometer laser pump may particularly suited for high amplification. A 0.98 micrometer pump may be a relatively low noise pump.

Isolators 680 may prevent feedback of the optical signal. Photonic detection modules 682, 694, and 696 are operable to receive optical signal power information at specific points within the DM 316 and to communicate that power level information to the AGC module 692. AGC module 692 may be operable to adjust the pumps in the laser pump back 690 to control the gain resulting from the amplification of the signal.

In operation, an optical signal is carried on optical fiber 318 to isolator 680. Pre-amplification module 684 amplifies and filters the signal as described in more detail in reference to FIG. 13 and forwards the signal to a second isolator 680. Splitter 686 splits the amplified and filtered signal and directs the signal to one or more ASSMs 688.

Each ASSM 688 comprises staged coupler and amplifier sets and is operable to passively split the optical signals into multiple signals and to output the signals to ports 700. Details of ASSM 688 are described in reference to FIG. 14. Amplifiers within the ASSMs 688 and within the pre-amplification module 684 may powered by the laser pump bank 690 via pump leads 698, and are operable to reduce a power loss of the signal resulting from the signal being passively split.

Additional isolators 680 may be provisioned where suitable in the module 316. For example, isolators 680 may be provisioned on the egress sides of ASSMs 688. Alternatively or in addition, optical terminators may be placed on the ports 700 to regulate reflection.

In the illustrated embodiment, four ASSMs 688 are shown. The modular nature of the ASSMs 688 allows the ASSMs 688 to feed multiple amplified signals to any number of ASSMs 688 connected in series, or to filters, receivers, local clients, or to other networks.

Photonic detection monitor 682 is operable to detect the power of the ingress optical signal. Photonic detection monitors 694 and 696 are each operable to detect the power of the egress optical signals of the ASSMs. Automatic gain control module 692 is operable to control the laser pumps within the laser pump module 690 so as to control the output power. In one embodiment, the power is kept to within eye-safe levels. In a particular embodiment, the power at an unconnected port 700 would not exceed the level corresponding to eye-safe standards or rules, which may be, for example, 17 dBm, or another established level. In another embodiment, the length of any doped fibers in the ASSM 316, the pump injecting the amplifying media, and any associated receivers and transmitters may be configured to allow each channel to be kept at a particular desired output and input power.

Referring to FIG. 12B, the CM 328 comprises photonic detection module 682, a pre-amplification module 684, a splitter 686, amplified splitter stage modules (ASSMs) 688, ports 700, automatic gain control (AGC) module 692, photonic detection module 694, and photonic detection module 696, as described above in reference to FIG. 12B. Isolators 702 may be provisioned as illustrated between ports 700 and ASSMs 688 and on the ingress and egress sides of the pre-amplification module 684. In another embodiment, isolators 702 may be omitted between ports 700 and ASSMs 688. For example, if transmitters are coupled to leads 312, isolators 702 may not be necessary. In addition or in the alternative, additional isolators 702 may be provisioned at other suitable locations in module 328.

In operation, the signal direction propagating through CM 328 in FIG. 12B, in contrast to DM 316 in FIG. 12A, is from right-to-left. Signals from leads 312 enter the CM, are combined by ASSMs 688, and exit the CM via lead 326.

Figure 13:
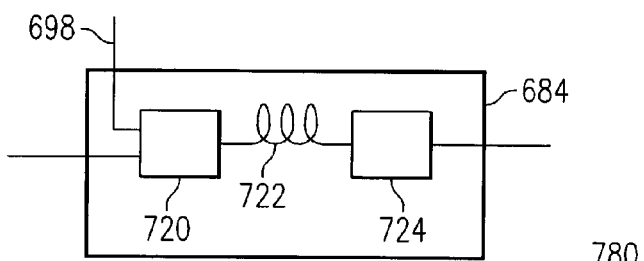
FIG. 13 is a block diagram illustrating details of the pre-amplification module of FIGS. 12A and 12B in accordance with one embodiment of the present invention.

FIG. 13 illustrates details of the pre-amplification module 684 of FIGS. 12A and 12B in accordance with one embodiment of the present invention. In this embodiment, erbium-doped fibers are used as the amplifying media.

Referring to FIG. 13, the pre-amplification module 684 comprises coupler 720, erbium doped fiber (EDF) 722, and gain flattening filter 724. Coupler 720 may comprise a WDM coupler or other suitable coupler.

In operation, pump coupler 720 may comprise a coupler 330 and may combine the ingress signal from optical fiber 318 with laser light from a 1.48 or 0.98 micrometer laser pump within laser pump bank 690 via pump lead 698. The laser light excites the photons within the EDF 722, thus amplifying the signal. In a particular embodiment, EDF 722 may comprise 10–30 meters of erbium-doped optical fiber.

Gain flattening filter 724 operates to substantially equalize among the various channels within the signal the gain resulting from the amplification.

Figure 14:
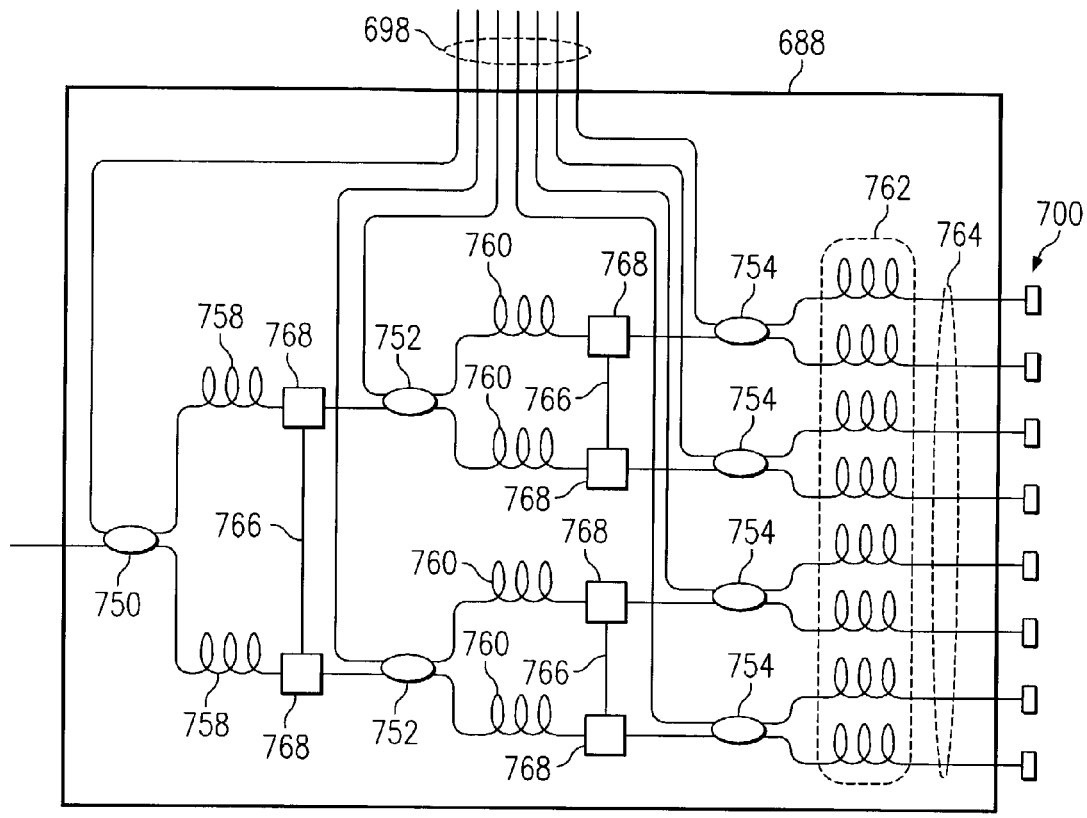
FIG. 14 is a block diagram illustrating details of the amplified splitter stages module of FIGS. 12A and 12B in accordance with one embodiment of the present invention.

FIG. 14 illustrates details of the ASSM 688 of FIGS. 12A and 12B in accordance with one embodiment of the present invention. In this embodiment, erbium-doped fibers are used as the gain media and are present at each of a plurality of amplifier stages.

Referring to FIG. 14, the ASSM 688 comprises stage one passive splitter 750, stage two passive splitters 752, stage three passive splitters 754, stage one EDFs 758, stage two EDFs 760, stage three EDFs 762, egress optical fibers 764, pump couplers 768, optical fiber connectors 766, and ports 700. Pump couplers 768 may comprise thin-film type WDM couplers (>30 dB pump isolation) or other suitable couplers. As illustrated, the splitter stages are arranged in a dendritic or tree-like branching pattern. In accordance with different embodiments, the ASSM 688 may have more or fewer stages and each stage may use 1:1, 2:2, 3:3, or other suitable splitters.

In operation, the staged splitters 750, 752, and 754 passively split the optical signal into multiple signals and add pump power to the signals. The splitters 750, 752, and 754 may comprise splitters/couplers 330 as described in reference to FIG. 3 or other suitable splitters. In the illustrated embodiment, eight signals are forwarded to the ports 700 and to optical fibers 764. EDFs 758, 760, and 762 amplify the power of each signal. Inclusion of in-line amplifier stages reduces the power loss of the optical signal occurring as a result of the signals being passively split. In a particular embodiment, an ASSM may be operable to substantially eliminate the power loss of the signals at the output ports relative to the input signal. "Substantially eliminate" in this context may mean a power loss of about zero dBm.

In one embodiment, the EDFs receive pump power from pumps in bank 690. Pump wavelength may be 1.48 micrometers or another suitable wavelength based upon the amplifying media or other suitable bases.

Pump couplers 768 and connectors 766 may guide residual pump power to other branches, allowing for residual pump power reuse and compensating for imbalance of the split signals. In this way, signal imbalance may be reduced and pump efficiency increased. In a particular embodiment, pump efficiency may be increased by 30% or more with the addition of the couplers 768, and output power from the ports may be equalized to within 1 dB. Such pump reuse may be realized without a noise figure penalty and with the transient response of the different ports being identical.

Figure 15A:
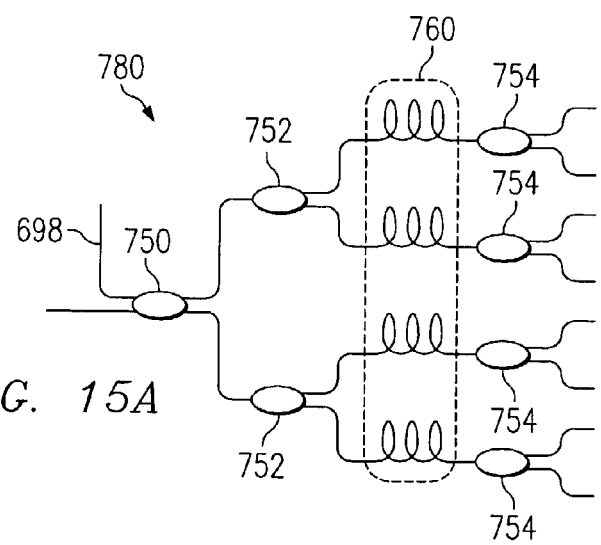
FIGS. 15A–15D are block diagrams illustrating configurations of the amplified splitter stages module of FIGS. 12A and 12B in accordance with various other embodiments of the present invention.
Figure 15B:
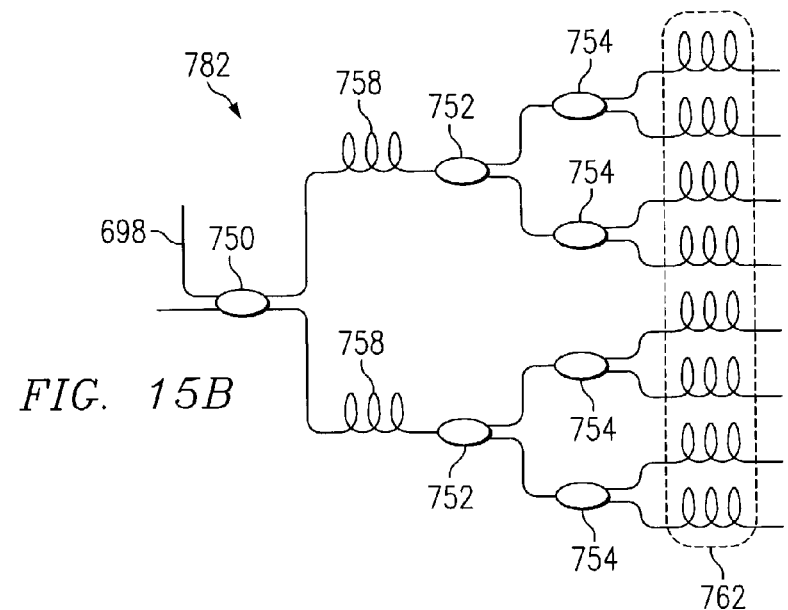
Figure 15C:
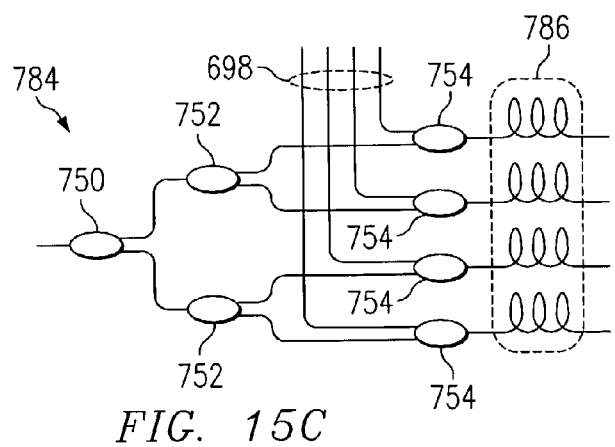
Figure 15D:
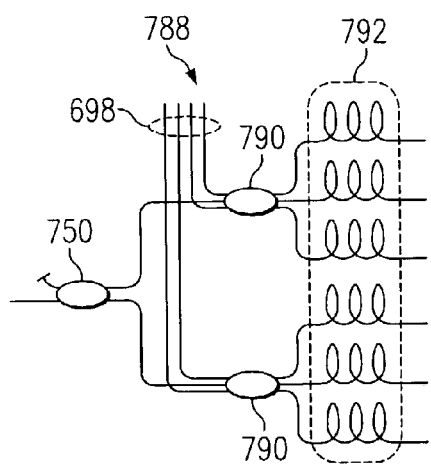

FIGS. 15A–15D are different configurations of the ASSM. In particular, FIG. 15A illustrates ASSM 780, FIG. 15B illustrates ASSM 782, FIG. 15C illustrates ASSM 784, and FIG. 15D illustrates ASSM 788. In each of these configurations, the number and/or location of the amplifier stages is varied. The number and position of the amplifier and splitter stages may depend on the application.

Referring to FIG. 15A, ASSM 780 comprises coupler stages 750, 752, and 754 as described above in reference to FIG. 14. EDFs 760 are provided in the second stage. Amplification laser light from the pump array 690 is carried on pump lead 698 and combines with the optical signal at first stage optical splitter 750. In another embodiment, laser light carried on pump lead 698 may combine with the optical signal at the second stage optical splitter 752.

Referring to FIG. 15B, configuration 782 comprises splitter stages 750, 752, and 754 as described above in reference to FIG. 14. EDFs 758 and 762 are provided in the first and third stages. Amplification laser light from the pump array 690 is carried on pump leads 698 and combines with the optical signal at splitter 750. Two EDFs 758 are placed between first stage splitter 750 and second stage splitters 752, one for each copy of the split signal. Eight EDFs 762 are placed after third stage splitter 754, one for each signal exiting third stage splitter 754.

Referring to FIG. 15C, configuration 784 comprises splitter stages 750, 752, and 754 as described above in reference to FIG. 14. EDFs 786 are provided in the third stage. Amplification laser light from the pump array 690 is carried on pump leads 698 and joins the split optical signals at third-stage splitters 754. Four EDFs 786 follow third stage splitters 754, one for each of the splitters.

Referring to FIG. 15D, configuration 788 comprises 2:2 splitter 750 and 3:3 splitters 790. 3:3 couplers 790 may receive amplification laser light via pump leads 698 as described above and each split the signal into three signals. EDFs 792 follow splitters 790 to amplify the split signals.

Figure 16A:
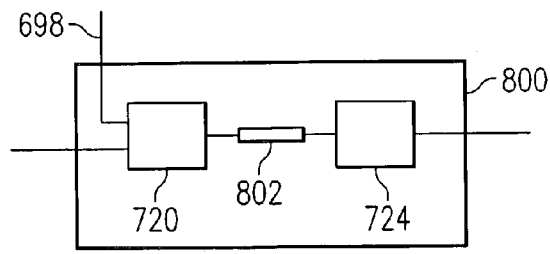
FIGS. 16A and 16B are block diagrams illustrating details of the pre-amplification system and the amplified splitter stages modules of FIGS. 12A and 12B in accordance with other embodiments of the present invention.
Figure 16B:
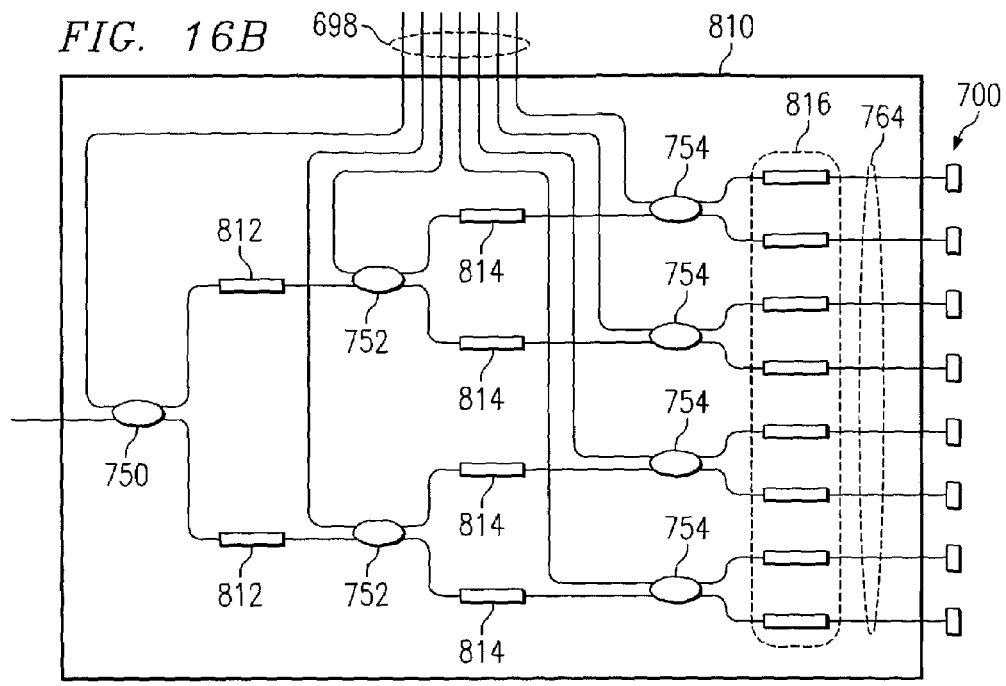

FIGS. 16A and 16B illustrate details of a pre-amplification module and an ASSM for DM 316 of FIGS. 12A and 12B in accordance with another embodiment of the present invention. In the embodiments shown in FIGS. 16A and 16B, optical signals are amplified by erbium-doped waveguides (EDWGs). The use of EDWGs may result in components with reduced price and reduced size.

Referring to FIG. 16A, the pre-amplification module 800 comprises pump coupler 720 and gain flattening filter 724 as described above in reference to FIG. 13. Module 800 further comprises EDWG 802 in place of an EDF.

In operation, pump coupler 720 combines the ingress signal with laser light from a laser pump within laser pump bank 690 via pump lead 698. The laser light excites the photons within EDWG 802, thus amplifying the signal. Gain flattening filter 724 operates to substantially equalize among the various channels within the signal the gain resulting from the amplification.

Referring to FIG. 16B, the ASSM 810 comprises stage one passive splitter 750, stage two passive splitters 752, stage three passive splitters 754, stage one EDWGs 812, stage two EDWGs 814, stage three EDWGs 816, optical fibers 764, and ports 700.

In operation, the staged splitters 750, 752, and 754 passively split the optical signal into multiple signals. In the illustrated embodiment, eight signals are forwarded to the ports 700 via optical fibers 764. EDWGs 812, 814, and 816 amplify the power of each signals, with laser light from laser pump bank 690 via the pump leads 698 thus reducing the power loss of the optical signal occurring as a result of the signals being passively split.

Figure 17:
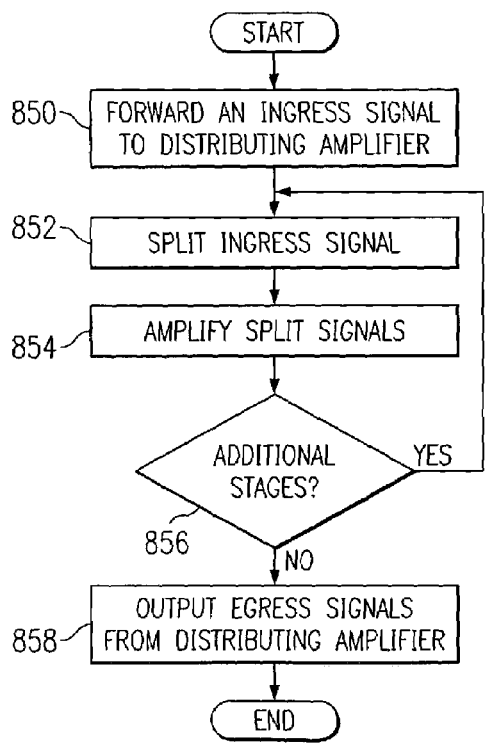
FIG. 17 is a flow diagram illustrating a method for distributing an optical signal in an amplified splitter stages module in accordance with one embodiment of the present invention.

FIG. 17 is a flow diagram illustrating a method for distributing an optical signal in an amplified splitter stages module in accordance with one embodiment of the present invention.

Referring to FIG. 17, the method begins with step 850 wherein an ingress optical signal from an optical ring or other transport fiber is forwarded to the distributing amplifier. Pre-amplification may be by EDFAs or EDWGs. The signal may be pre-amplified and filtered through a gain flattening filter to substantially equalize among the various channels within the signal the gain resulting from the pre-amplification.

At step 852, the signal enters the ASSM and is passively split into a plurality of signals. Continuing to step 854, the split signals may be amplified. As described above in reference to FIGS. 14 and 16B, the amplifiers may comprise EDFAs, EWGs, or other suitable amplifiers. As described in reference to FIGS. 15A–D, the number of amplifier stages may or may not correspond to the number of splitter stages; therefore, step 854 may in certain embodiments or in certain iterations be omitted after step 852.

At decisional step 856, if the ASSM comprises additional stages, then the method returns to steps 852 and 854 and further splitting and amplification is accomplished. If the ASSM does not comprise further stages, then the method proceeds to step 858.

Proceeding to step 858, the egress signal is outputted from the DM. The output may be to a port 700 and may be communicated to a receiver, an ASSM, an expansion board, a local client, a filter, or other suitable recipient.

The present invention is not limited to a specific number of stages or resulting signals. Any number of stages may be selected to result in the desired number of signals. Alternatively, the method of FIG. 17 may comprise the method of a single distribution module. Additional modules, each comprising a given number of stages and outputting a given number of signals, may be added in a modular fashion as described in reference to FIG. 12A.

Figure 18:
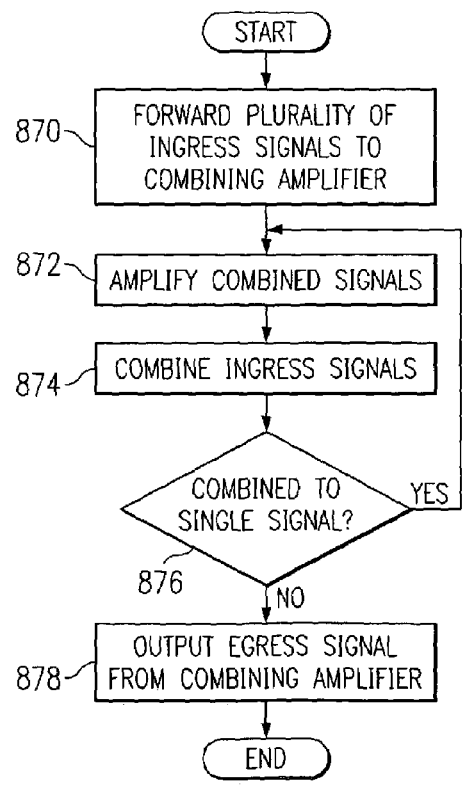
FIG. 18 is a flow diagram illustrating a method of amplifying and combining a plurality of signals into a single signal in accordance with one embodiment of the present invention.

FIG. 18 is a flow diagram illustrating a method for combining an optical signal in an amplified splitter stage module in accordance with one embodiment of the present invention.

Referring to FIG. 18, the method begins with step 870 wherein a plurality of ingress signals from a local client or from another source are forwarded to the combining amplifier. At step 872, the ingress signals enter the ASSM and are amplified. At step 874, the amplified signals are passively combined. As described in reference to FIGS. 15A–D, the number of amplifier stages in an ASSM embodiment may or may not correspond to the number of splitter stages; therefore, step 872 may in certain embodiments or in certain iterations be omitted before step 874.

At decisional step 876, if the signals have been suitably combined to a single signal, then the method proceeds to step 878. If the signals have not been combined to form a single signal, then the method returns to step 874 wherein the signals are further combined. In another embodiment, the signals may also be further amplified.

If the signals have been combined to a single signal, then at step 878, the egress signal from the ASSM is outputted. The output from the ASSMs may be to an egress lead from the CM or to another ASSM, or another suitable recipient.

Figure 19:
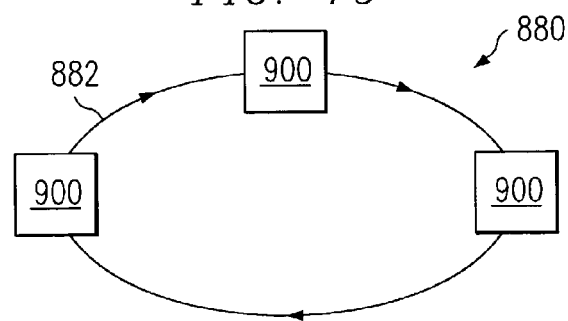
FIG. 19 is a block diagram illustrating an optical network in accordance with another embodiment of the present invention.

FIG. 19 illustrates an optical network 880 in accordance with another embodiment of the present invention. The optical network 880 is a single-ring optical network, in contrast to the dual-ring optical network of FIG. 1. In this embodiment, the network 880 is an optical network in which a number of optical channels are carried over a common path at disparate wavelengths. The network 880 may be a wavelength division multiplexing (WDM), dense wavelength division multiplexing (DWDM), or other suitable multichannel network. The network 880 may be used in a short haul metropolitan network, a long haul inner city network, or any other suitable network or combination of networks.

Referring to FIG. 19, the network 880 includes a fiber optical ring 882 and a plurality of nodes 900. Optical information signals are transmitted on the ring 882 and have at least one characteristic modulated to encode audio, video, textual, real-time, non real-time, and/or other suitable data. Modulation may be based on phase shift keying (PSK), intensity modulation (IM), and other suitable methodologies.

The nodes 900 are operable to add and drop or otherwise route traffic to and from the ring 882. At each node, traffic from local clients is added to the ring 882 while traffic destined for local traffic is dropped. Further details regarding the nodes 900 in accordance with various embodiments of the present invention are discussed in reference to FIGS. 19 and 22.

Figure 20:
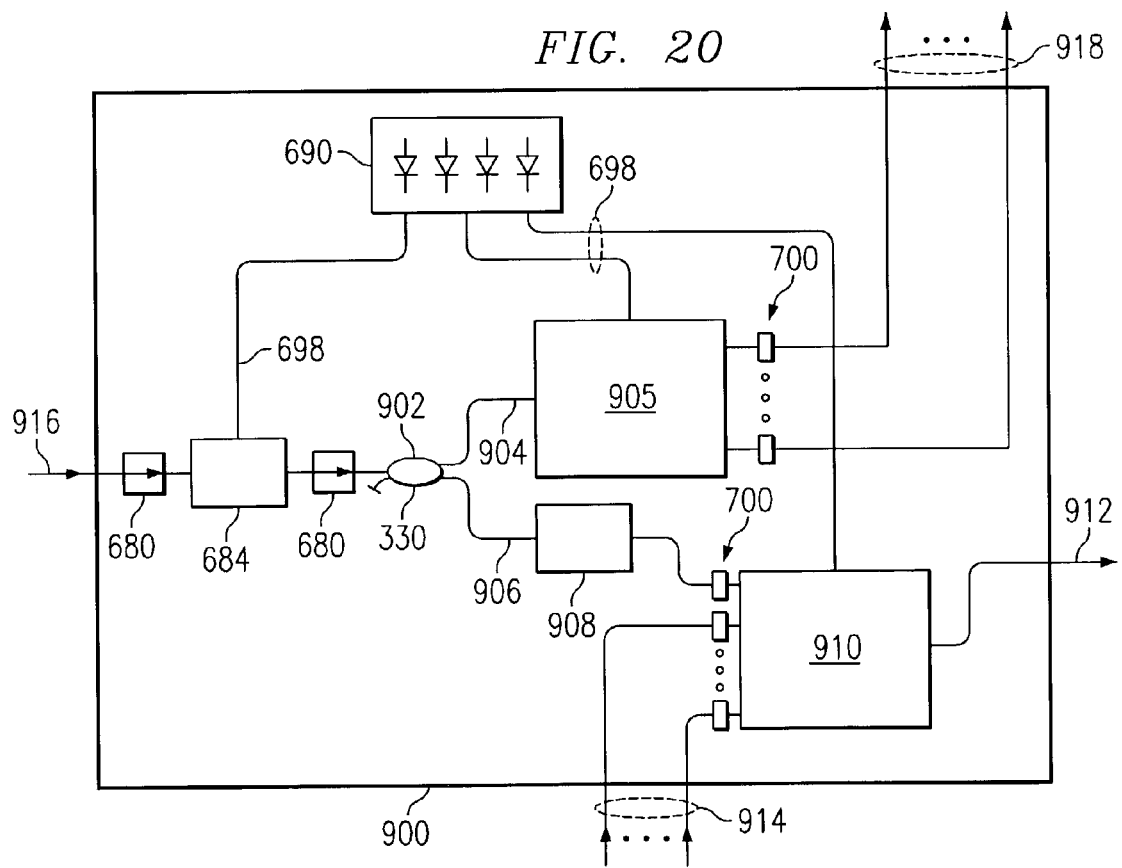
FIG. 20 is a block diagram illustrating details of an add/drop node of the network of FIG. 19 in accordance with one embodiment of the present invention.

FIG. 20 illustrates details of an add/drop node 900 in accordance with one embodiment of the present invention. The add/drop node 900 may be used in a ring or other suitable optical network and is operable to add selected traffic to and drop selected traffic from such a network.

Referring to FIG. 20, the node 900 comprises a pre-amplification system 684, isolators 680, a laser pump bank 690, a distributing ASSM 905, and pump leads 698 as described in reference to FIGS. 12–14. The node 900 may also have automatic gain control as described above. Node 900 further comprises a coupler 902, a filter module 908, a plurality of drop leads 918, a combining ASSM 910, add leads 914, optical fiber segment 904, and optical fiber segment 906. The node may further comprise an AGC module (not illustrated) as described in reference to FIGS. 12A and 12B. Additional isolators 680 may be provisioned at suitable locations.

In operation, a network signal is received by the node via ingress lead 916 and is amplified and filtered in pre-amplification module 684. The network signal may comprise a plurality of channels. Laser light from a laser pump within laser pump bank 690 powers the amplifier within pre-amplification module 684 and amplifies the signal.

Coupler 902 splits the signal and forwards a copy of the signal to distributing ASSM 905 via optical fiber segment 904 and a copy of the signal to filter module 908 via optical fiber segment 906. In one embodiment, coupler 902 may split the signal in an unequal fashion such that pass through traffic receives approximately 90% of the power of the optical signal and drop traffic receives the remaining approximately 10%. In this way, a majority of the power of the optical signal is transmitted back to the network.

In the illustrated embodiment, filter module 908 may be operable to enable re-use of channels by filtering out channels to be added via combining ASSM 910. The filter module may also be operable to open the ring for a particular channel. Filter module 908 may comprise wavelength filters comprising optical switches and/or optical cross connects, or other suitable filters.

As described in reference to FIG. 14, distributing ASSM 705 is operable to passively split the optical signal into multiple copies via staged splitters and, via staged amplifiers, to reduce the power loss resulting from the signal being passively split. The amplifiers within ASSM 905 may be powered by laser light pumps within laser pump bank 690 fed to ASSM 905 via pump leads 698. The output signals of ASSM 905 are forwarded to ports 700 which may be connected to drop leads 918. The dropped signals may be forwarded to a local client, to another network, and/or another suitable receiving location via drop leads 918.

Optical signals from an external source, such as a local client or another network, may be received at add leads 914. Combining ASSM 910 is operable to passively combine the signal into a single signal and to amplify the signal for transmittal on egress lead 912.

The node 900 allows for flexible channel spacing. Only transmitters which may be connected to leads 914 and receivers which may be connected to leads 918 need to be configured for specific channels or wavelengths.

FIG. 21 illustrates a method of adding and dropping signals to and from the node of FIG. 20 in accordance with one embodiment of the present invention.

Referring to FIG. 21, the method begins with step 930 wherein an ingress signal is preamplified. This may be done using a preamplification system described in reference to FIG. 13 or another suitable preamplification system. At step 932, the preamplified signal is passively split into a first ingress signal and a second ingress signal using a passive splitter coupler.

Proceeding to step 934, the first ingress signal distributed to a local client. In one embodiment, the distribution may comprise passively splitting and amplifying the first ingress signal into multiple drop signals using an ASSM module 688, as described previously in greater detail in reference to FIG. 17 or with another suitable method. The drop signals may, before or upon reaching the local client, be filtered and received at a receiving unit such as a broadband receiver.

Proceeding to step 936, the second ingress signal copy is forwarded to filter module 908. At step 938, the filter module 908 filters selected channels from the second ingress signal, creating a filtered pass-through signal. In one embodiment, dropped traffic may be removed, by the filter, thus enabling reuse of dropped channels.

Proceeding to step 940, a plurality of add optical signals from a local client is amplified and passively combined into a signal add signal, either as described in reference to FIG. 20 or via another suitable method. At step 942, the add signal is combined with the filtered pass-through signal to create an egress signal, and at step 944 the egress signal is forwarded back to the network via egress lead 912.

Figure 22:
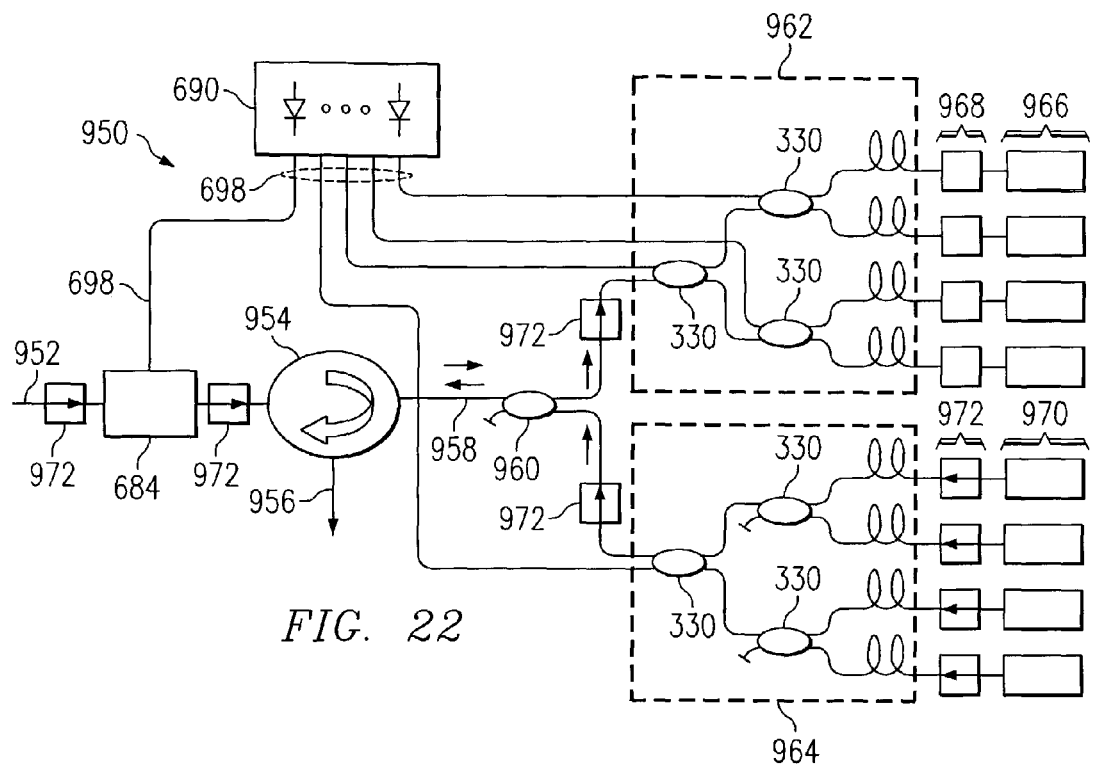
FIG. 22 is a block diagram illustrating an add/drop node for the network of FIG. 19 in accordance with another embodiment of the present invention.

FIG. 22 is a block diagram illustrating an add/drop node 950 in accordance with another embodiment of the present invention. The add/drop node 950 may be used in place of the add/drop node 900 in network 880 or in conjunction with node 900.

Referring to FIG. 22, the add/drop node 950 comprises ingress lead 952, circulator 954, egress lead 956, coupler 960, distributing ASSM 962, combining ASSM 964, isolators 972, and optical fiber 958. Add/drop module 950 also comprises a pre-amplification system 684 which may comprise elements operable as described in reference to FIG. 13 or 16A. Circulator 954 may comprise a three pole circulator. Coupler 960 may comprise a splitter/coupler 330; in a particular embodiment, coupler 960 may be a 50/50 coupler.

In operation, pre-amplification system 684 may amplify and filter an ingress optical signal from a network. Circulator 954 is operable to direct the ingress signal to distributing ASSM 962 via coupler 960 and to direct the combined egress signal out of the module 950 and back to the network via egress lead 956.

Distributing ASSM 962 splits and amplifies the ingress signal. Tunable filters 968 are operable to select any wavelength within a given ingress signal copy. Receivers 966 may comprise broadband receivers operable to receive the selected signal from the filters 968.

A plurality of ingress optical signals may originate from transponders 970 to be combined and amplified with combining ASSM 964. Splitters 330 with the add module 964 combine the plurality of egress signals into a combined egress signal with is then carried to circulator 954 via optical fibers 386 and 366.

The add/drop node 950 may further comprise mirrors at the terminal ends of the combining ASSM 964 or the distributing ASSM 962 operable to reflect the signal back to the circulator 954 and back to the network via egress lead 956. Filters may be placed in a suitable location, if necessary, to avoid signal interference of the incoming signals with the reflected signal. Isolators 972 may prevent feedback of the optical signal.

Figure 23:
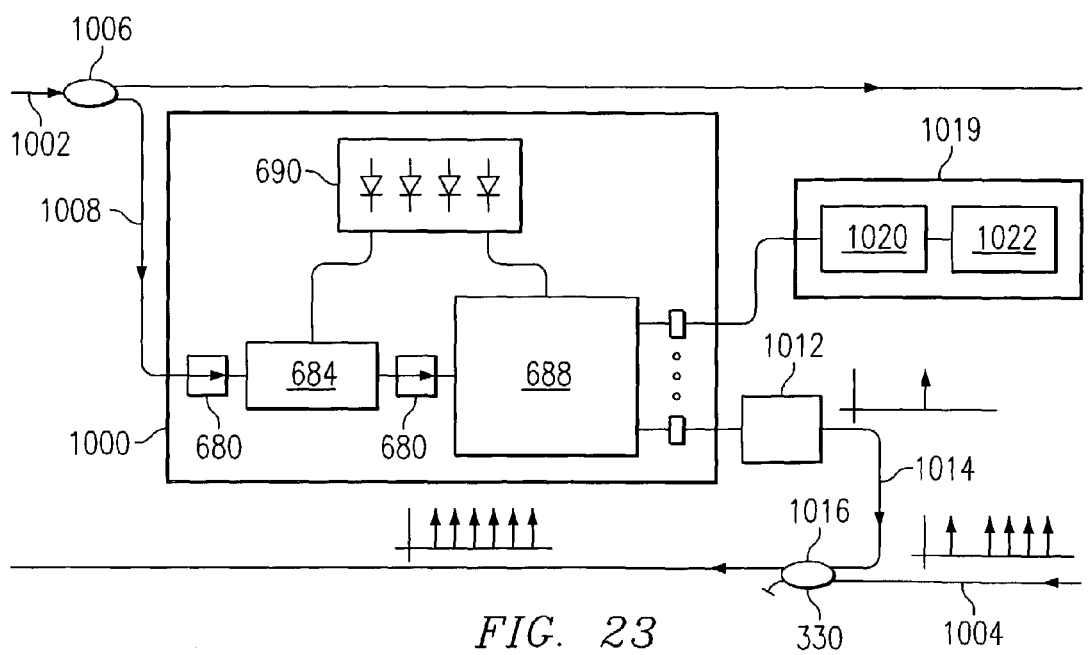
FIG. 23 is a block diagram representing an inter-ring module connecting two networks in accordance with an embodiment of the present invention.

FIG. 23 illustrates an inter-ring module connecting two networks in accordance with one embodiment of the present invention.

Referring to FIG. 23, the inter-ring module 1000 comprises laser pump bank 690, isolators 680, pre-amplification system 684, and ASSM 688 as described above in reference to FIGS. 12–14. The module 1000 may further comprise an AGC module (not illustrated) as described in reference to FIGS. 12A and 12B. Additional isolators 680 may be provisioned in other suitable locations.

In operation, an optical signal in a first network carried on optical fiber 1002 is split via splitter 1006 with a drop signal forwarded to optical fiber 1008 to amplification/distribution module 1000. At pre-amplification system 684, the signal is pre-amplified and filtered as described in conjunction with FIG. 13 or 16A. ASSM 688 amplifies and passively splits the signal from the pre-amplification module 684 into multiple copies as described in conjunction with FIG. 14 or 16B.

In the illustrated embodiment, a local client 1019 receives a first copy of the signal from ASSM 688. Tunable filter 1020 is configured to pass a specific channel or channels to receiver 1022.

Optical fiber 1004 of a second network is operable to receive a second copy of the split signal from the ASSM 688. Module 1012 may be a tunable filter and/or a 2R module or a 3R module, and is configured to pass a specific channel or channels to a second network via optical fiber 1014. Splitter 1016 combines the selected channel with the channels carried on optical fiber 1004.

It will be understood that in accordance with various embodiments of the present invention, the module 1000 may be a part of or comprise a node on a ring, or intermediate node. In addition, the filtering, adding, and dropping functionality may be suitable distributed between nodes.

Figure 24:
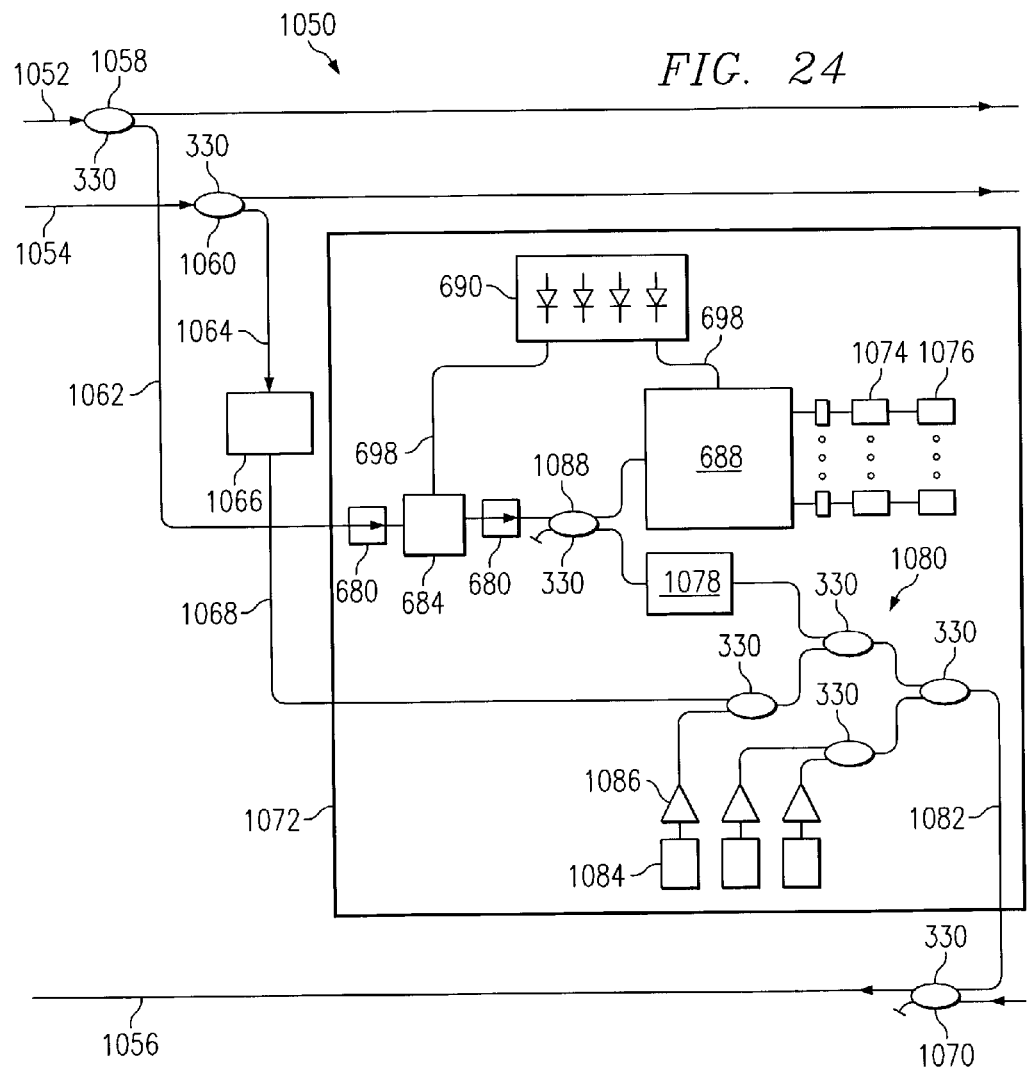
FIG. 24 is a block diagram representing an inter-ring module connecting three networks in accordance with one embodiment of the present invention.

FIG. 24 is a block diagram representing an inter-ring module system connecting three networks in accordance with one embodiment of the present invention. The networks include a first network, represented by optical fiber 1052, a second network, represented by optical fiber 1054, and a third network, represented by optical fiber 1056.

Referring to FIG. 24, inter-ring module 1072 comprises pre-amplification system 684, isolators 680, laser pump bank 690, pump leads 698, splitter 1084, filter module 1078, ASSM 688, a plurality of filters 1074, a plurality of receivers 1076, combiner 1080, and connect lead 1082. The module 1072 further comprises a plurality of transmitters 1086, and a plurality of amplifiers 1086. Module 1072 may further comprise an AGC module as described in reference to FIGS. 12A and 12B (not illustrated). Additional isolators 680 may be provisioned at other suitable locations.

In operation, a signal from a first network 1052 is split via splitter 1058 and carried via optical fiber 1062. The signal from fiber 1062 is amplified and filtered in pre-amplification module 684. The signal from the first network may comprise a plurality of channels. Laser light from a 1.48 micrometer or 0.98 micrometer laser pump within laser pump bank 690 powers the amplifier within pre-amplification module 684 and amplifies the signal.

Splitter 1088 splits the signal and transmits a copy of the signal to ASSM 688 and a copy of the signal to filter module 1078. In one embodiment, splitter 1088 may split the signal in an unequal fashion such that filter module 1078 receives approximately 90% of the power of the optical signal and ASSM 688 receives the remaining approximately 10%. In this way, a majority of the power of the optical signal is transmitted to the fiber 1056 of the third network.

A signal from a second network may be dropped from fiber 1054 via splitter 1080 and, via fiber lead 1064, to filter module 1066. Filter module 1066 may be configured to selectively pass specific channels. Filter module 1066 in one embodiment may act as a group filter, allowing groups of channels, for example λ16–λ19, to node 1072 via lead 1068.

Combiner 1080 comprises a dendritic pattern of couplers/splitters 330 and is operable to combine the first network signal from filter 1078, the second network signal from fiber 1054 via segment 1068, and local add traffic from transmitters 1084. Combiner 1080 forwards the combined signal to third network fiber 1056 via coupler 1070.

In the illustrated embodiment, filter module 1078 may be operable to enable re-use of channels by filtering out channels to be added via transmitters 1084 to combiner 1080 or from second ring 1054. For example, if the group of channels comprising λ16–λ19 have been added from second ring 1054, filter module 1078 may act as a group rejection filter for λ16–λ19.

As described in more detail above in reference to FIG. 14, ASSM 688 is operable to passively split the optical signal into multiple signals via staged splitters and, via staged amplifiers, to reduce the power loss resulting from the signal being passively split. The amplifiers within ASSM 688 may be powered by, in one embodiment, 1.48 micrometer laser light pumps within laser pump bank 690 fed to ASSM 688 via pump leads 698.

Each of the filters 1074 may be configured to pass a specific channel or channels to receivers 1076. In a particular embodiment, the filters 1074 may comprise tunable filters.

Receivers 1076 receive the filtered signal from filters 1074. In a particular embodiment, the receivers 1076 may comprise broadband receivers.

It will be understood that in accordance with various embodiments of the invention, the module 1072 may be part of or may comprise a node on a ring, or may be an intermediate node. In addition, the filtering, adding, dropping, and/or distributing functionality may be suitable distributed between nodes.

FIG. 25 illustrates a method of dropping a signal from a first optical network and forwarding the signal to a second network in accordance with the embodiment of the present invention shown in FIG. 23 or 24.

The method begins at step 1100 wherein a signal is dropped from the first ring. At step 1102, the drop signal is filtered with filter module 1012, filter module 1078 or other suitable filter module to pass only inter-ring traffic. Non-inter-ring traffic may be dropped to a local client as described in reference to FIGS. 23 and/or 24 or otherwise disposed of.

Proceeding to step 1104, traffic from other sources are added to the inter-ring traffic to create a second ring add signal as described in reference to FIG. 24. Finally, at step 1106, the second ring add signal is added to the second ring.

Although the present invention has been described with several embodiments, various changes and modifications may be suggested to one skilled in the art. It is intended that the present invention encompass such changes and modifications as fall within the scope of the appended claims.

What is claimed is:

1. An optical node for distributing optical signals, comprising:
   a plurality of optical splitter stages within the optical node, the optical splitter stages each operable to passively split each of one or more optical signals provided to the stage into a plurality of optical signals having substantially identical content, the plurality of optical stages comprising:
      a first optical splitter stage including an optical splitter operable to split a first stage ingress signal into a plurality of first stage egress signals; and
      a second optical splitter stage including a different optical splitter for each of the first stage egress signals, each second-stage optical splitter operable to split the associated first stage egress signal into a plurality of second stage egress signals;
   the first and second optical splitter stages each comprising an amplification stage, the amplification stage including a plurality of gain media;
   the gain media each operable to amplify an associated egress signal from the associated optical splitter stage with pump power; and
   wherein the optical splitter stages comprise a plurality of branches, and further comprising couplers connecting at least two of the branches to reduce an imbalance of signal power of the branches.

2. The system of claim 1, wherein the gain media comprise erbium-doped optical fibers.

3. The system of claim 1, wherein the gain media comprise doped optical fibers.

4. The system of claim 1, wherein the gain media comprise erbium-doped waveguides.

5. The system of claim 1, wherein the amplification stages includes a pump splitter operable to feed pump power into the amplification stage.

6. The system of claim 5, wherein the amplification stage is downstream of a stage including a pump splitter operable to feed pump power into the amplification stage.

7. The system of claim 1, the plurality of optical splitter stages each comprising one or more optical splitters, the optical splitters operable to passively split a provided optical signal into a plurality of optical signals.

8. The system of claim 7, further comprising:
   a plurality of the optical splitters comprising pump combiners; and
   the pump combiners each operable to feed pump power into an optical splitter stage, including the pump combiner.

9. The system of claim 7, wherein the optical splitters each comprise a 2:2 coupler.

10. The system of claim 7, wherein the optical splitters each comprise a 3:3 coupler.

11. The system of claim 1, further comprising a preamplifier, the preamplifier including a pump coupler operable to feed pump power into the preamplifier, a gain medium operable to amplify a preamplifier ingress signal with the pump power and a gain flattener operable to limit gain in the preamplifier.

12. The system of claim 11, further comprising an isolator coupled between a transmission link and the preamplifier.

13. The system of claim 1, further comprising a controller operable to control gain of optical signals in a distribution system.

14. The system of claim 13, the controller operable to limit a power of optical signals at specified points in the distribution system to less than about 17 dBm.

15. The system of claim 13, wherein the controller comprises an automatic gain controller (AGC), the AGC operable to monitor a power of ingress and egress optical signals of the distribution system and to control pump power based on the power of the ingress and egress optical signals.

16. The system of claim 14, wherein the specified points comprise expansion ports of the distribution system.

17. The system of claim 1, wherein the amplification stage is operable to substantially eliminate a power loss of the signal being passively split.

18. A method for distributing an optical signal at an optical node, comprising:
passively splitting, at the optical node, an ingress optical signal comprising one or more channels into a plurality of egress optical signals each having substantially identical content as the ingress optical signal and each comprising the one or more channels, wherein passively splitting the ingress optical signal comprises:
using a first optical splitter stage including an optical splitter to split the ingress signal into a plurality of first stage egress signals; and
using a second optical splitter stage, including a different optical splitter for each of the first stage egress signals, to split each of the first stage egress signals into a plurality of second stage egress signals;
amplifying, at the optical node, each of the first stage and second stage egress optical signals with pump power; and
reducing an imbalance of signal power resulting from the optical signal being passively split.

19. The method of claim 18, wherein the egress optical signals are each amplified in a gain medium comprising a doped fiber.

20. The method of claim 18, wherein the egress optical signals are each amplified in a gain medium comprising an erbium-doped fiber.

21. The method of claim 18, wherein the egress optical signals are each amplified in a gain medium comprising an erbium-doped waveguide.

22. The method of claim 18, wherein the optical signal comprises a single channel, further comprising providing each of the egress optical signals to a subscriber of the channel.

23. The method of claim 18, further comprising preamplifying the ingress optical signal prior to passively splitting the ingress optical signal.

24. The method of claim 18, further comprising controlling amplification gain.

25. The method of claim 18, further comprising:
monitoring a power level of the ingress optical signal and an egress optical signal;
determining a gain based on the power levels of the ingress and egress optical signals; and
controlling pump power based on the determined gain.

26. The method of claim 18, further comprising limiting the power of the egress optical signals to an eye-safe level.

27. The method of claim 18, wherein amplifying each of the egress optical signals substantially eliminates a power loss of the egress signals relative to the ingress signal.

28. An optical node for distributing an optical signal, comprising:
means for passively splitting, at the optical node, an ingress optical signal comprising one or more channels into a plurality of egress optical signals each having substantially identical content as the ingress optical signal and each comprising the one or more channels, wherein the means for passively splitting the ingress optical signal comprises:
a first optical splitter stage means operable to split the ingress signal into a plurality of first stage egress signals; and
a second optical splitter stage means operable to split each of the first stage egress signals into a plurality of second stage egress signals;
means for amplifying, at the optical node, each of the first stage and second stage egress optical signals with pump; and
means for reducing an imbalance of signal power resulting from the optical signal being passively split.

29. The system of claim 28, wherein the egress optical signals are each amplified in a gain medium comprising a doped fiber.

30. The system of claim 28, wherein the egress optical signals are each amplified in a gain medium comprising an erbium-doped fiber.

31. The system of claim 28, wherein the egress optical signals are each amplified in a gain medium comprising an erbium-doped waveguide.

32. The system of claim 28, wherein the optical signal comprises a single channel, further comprising providing each of the egress optical signals to a subscriber of the channel.

33. The system of claim 28, further comprising means for preamplifying the ingress optical signal prior to passively splitting the ingress optical signal.

34. The system of claim 28, further comprising means for controlling amplification gain.

35. The system of claim 28, further comprising:
means for monitoring a power level of the ingress optical signal and an egress optical signal;
means for determining a gain based on the power levels of the ingress and egress optical signals; and
means for controlling pump power based on the determined gain.

36. The system of claim 28, further comprising means for limiting the power of the egress optical signals to an eye-safe level.

37. The system of claim 28, wherein the means for amplifying each of the egress optical signals is operable to substantially eliminate a power loss of the egress signals relative to the ingress signal.

* * * * *